(12) United States Patent
Ozawa

(10) Patent No.: US 9,191,536 B2
(45) Date of Patent: Nov. 17, 2015

(54) PROCESSING APPARATUS

(71) Applicant: Brother Kogyo Kabushiki Kaisha, Nagoya-shi, Aichi-ken (JP)

(72) Inventor: Ryohei Ozawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/466,219

(22) Filed: Aug. 22, 2014

(65) Prior Publication Data

US 2015/0055193 A1   Feb. 26, 2015

(30) Foreign Application Priority Data

Aug. 23, 2013   (JP) .................................. 2013-173513

(51) Int. Cl.
*H04N 1/04* (2006.01)
*H04N 1/00* (2006.01)

(52) U.S. Cl.
CPC ................................. *H04N 1/00801* (2013.01)

(58) Field of Classification Search
CPC .................................................. H04N 1/00801
USPC ................................ 358/1.9, 1.13, 1.14, 1.15
See application file for complete search history.

(56) References Cited

U.S. PATENT DOCUMENTS 6,009,212 A * 12/1999 Miller et al. .................. 382/294

FOREIGN PATENT DOCUMENTS

JP   2001-076127 A   3/2001
JP   2007-140593 A   6/2007

* cited by examiner

*Primary Examiner* — Houshang Safaipour
(74) *Attorney, Agent, or Firm* — Banner & Witcoff, Ltd.

(57) ABSTRACT

A processing apparatus includes: a processor; and a memory storing instructions, the instructions, when executed by the processor, causing the processing apparatus to perform: receiving read image data, which is image data generated by reading an object with an image reading apparatus; extracting a target image, which is an image having a part indicating the object, from a read image that is an image indicated by the read image data; and generating output data, which indicates a synthesis image in which the target image and a template image are synthesized, wherein the template image has an assignment area to which the target image is assigned, and wherein the generating comprises arranging two or more of the same target images on the assignment area.

20 Claims, 18 Drawing Sheets

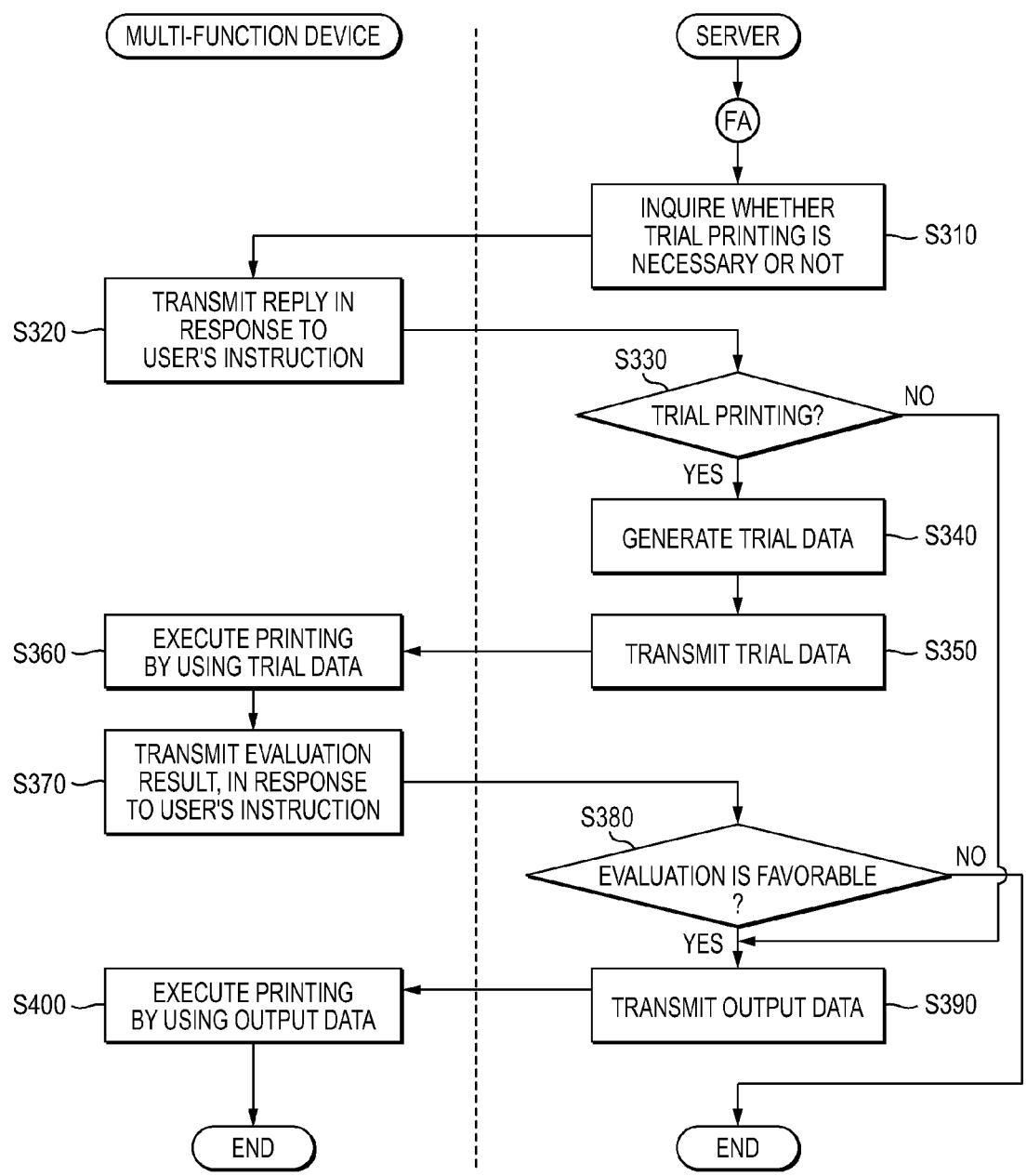

PROCESSING APPARATUS

CROSS-REFERENCE TO RELATED APPLICATIONS

This application claims priority from Japanese Patent Application No. 2013-173513 filed on Aug. 23, 2013, the entire subject-matter of which is incorporated herein by reference.

TECHNICAL FIELD

The disclosure relates to a technology of generating data indicating a synthesis image having a plurality of images synthesized therein.

BACKGROUND

A variety of processing has been performed for image data indicating an image. For example, there has been proposed a technology of synthesizing an image read by a scanner in a synthesis area of a template image and printing the synthesis image.

SUMMARY

Illustrative aspects of the present invention provide a novel technology of synthesizing an image.

According to one illustrative aspect of the present invention, there is provided a processing apparatus comprising: a processor; and a memory storing instructions, the instructions, when executed by the processor, causing the processing apparatus to perform: receiving read image data, which is image data generated by reading an object with an image reading apparatus; extracting a target image, which is an image having a part indicating the object, from a read image that is an image indicated by the read image data; and generating output data, which indicates a synthesis image in which the target image and a template image are synthesized, wherein the template image has an assignment area to which the target image is assigned, and wherein the generating comprises arranging two or more of the same target images on the assignment area.

According to another illustrative aspect of the present invention, there is provided a processing apparatus comprising: a processor; and a memory storing instructions, the instructions, when executed by the processor, causing the processing apparatus to perform: receiving read image data, which is image data generated by reading an object with an image reading apparatus; extracting a target image, which is an image having a part indicating the object, from a read image that is an image indicated by the read image data; and generating output data, which indicates a synthesis image in which an image obtained by changing a size of the target image and a template image are synthesized, wherein the template image has: an assignment area to which the target image is assigned; and a reference area that has the assignment area and becomes a reference of the change in the size of the target image, and wherein the generating comprises changing the size of the target image in conformity to the reference area.

BRIEF DESCRIPTION OF THE DRAWINGS

FIG. 3 is a flowchart of the image processing.

DETAILED DESCRIPTION

<General Overview>

Figure 1:
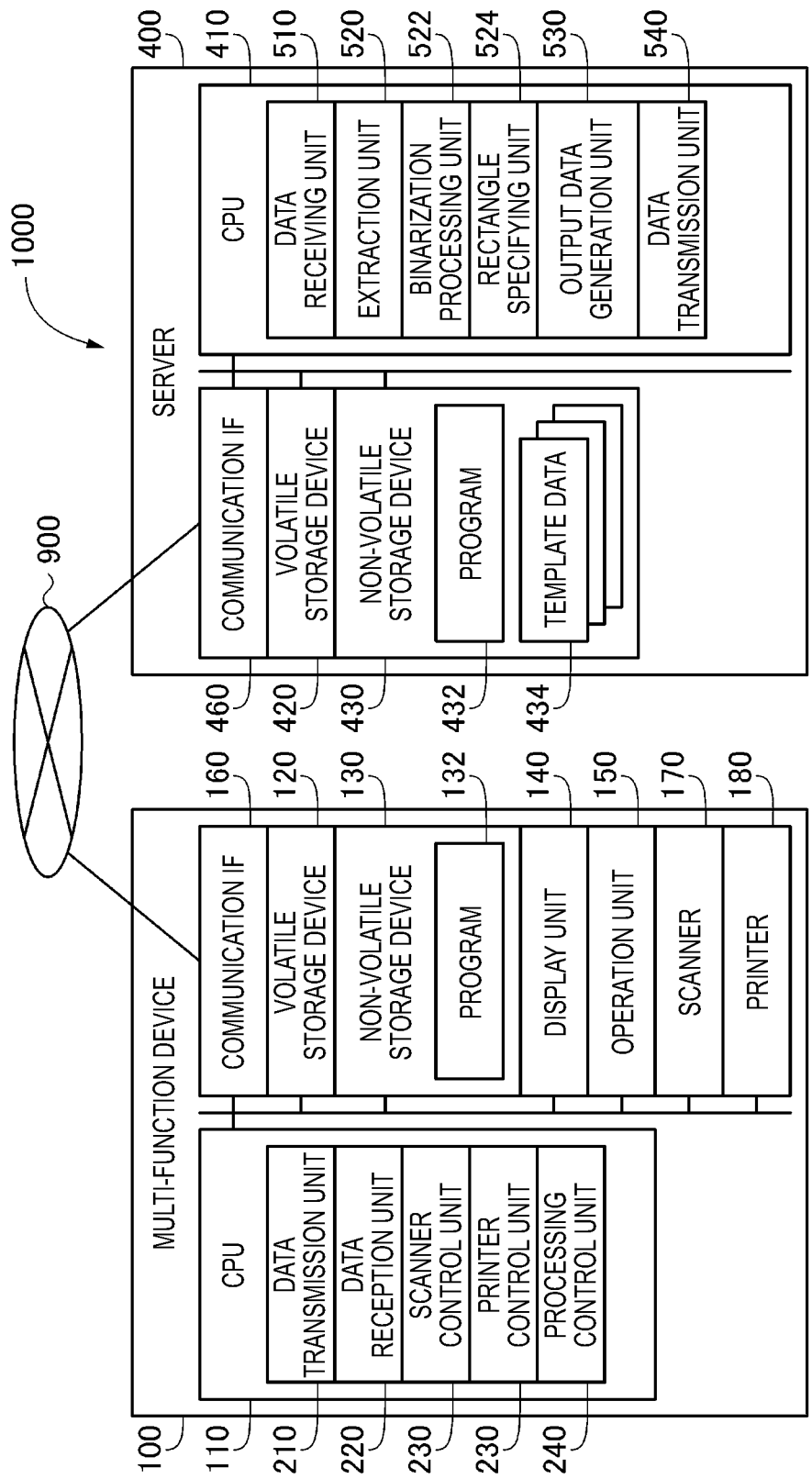
FIG. 1 illustrates an image processing system according to an illustrative embodiment of the present invention.

In the above-described related-art technology, a sufficient improvement has not been made as regards the synthesis of an image. For example, when an image having a small image size is synthesized, a blank part in a synthesis area may become large.

Therefore, illustrative aspects of the present invention provide a novel technology of synthesizing an image.

According to one illustrative aspect of the present invention, there may be provided a processing apparatus comprising: a processor; and a memory storing instructions, the instructions, when executed by the processor, causing the processing apparatus to perform: receiving read image data, which is image data generated by reading an object with an image reading apparatus; extracting a target image, which is an image having a part indicating the object, from a read image that is an image indicated by the read image data; and generating output data, which indicates a synthesis image in which the target image and a template image are synthesized, wherein the template image has an assignment area to which the target image is assigned, and wherein the generating comprises arranging two or more of the same target images on the assignment area.

According thereto, since the two or more of the same target images are arranged on the assignment area of the template image, it is possible to easily generate the synthesis image in which the target images and the template image are synthesized.

According to another illustrative aspect of the present invention, there may be provided a processing apparatus comprising: a processor; and a memory storing instructions, the instructions, when executed by the processor, causing the processing apparatus to perform: receiving read image data, which is image data generated by reading an object with an image reading apparatus; extracting a target image, which is an image having a part indicating the object, from a read image that is an image indicated by the read image data; and generating output data, which indicates a synthesis image in which an image obtained by changing a size of the target image and a template image are synthesized, wherein the template image has: an assignment area to which the target image is assigned; and a reference area that has the assignment area and becomes a reference of the change in the size of the target image, and wherein the generating comprises changing the size of the target image in conformity to the reference area.

According thereto, since the size of the target image is changed in conformity to the reference area including the assignment area, it is possible to easily generate the synthesis image in which an image obtained by changing the size of the target image and the template image are synthesized.

Incidentally, the present invention can be implemented in a variety of aspects. For example, the present invention can be implemented in forms of a data processing method, a data processing apparatus, a computer program for implementing functions of the method or apparatus, a recording medium (for example, a non-transitory computer-readable recording medium) having the computer program recorded therein, and the like.

<Illustrative Embodiments>

A. First Illustrative Embodiment

FIG. 1 illustrates an image processing system according to an illustrative embodiment of the present invention. The image processing system 1000 has a network 900, a multi-function device 100 connected to the network 900 and a server 400 connected to the network 900. The image processing system 1000 performs a printing on a picture surface of a greeting card (a so-called New Year's card).

The multi-function device 100 has a processor 110, a volatile storage device 120, a non-volatile storage device 130, a display unit 140, an operation unit 150, a communication interface 160, a scanner 170 and a printer 180.

The processor 110 is a data processing device, and for example, is a so-called CPU. The volatile storage device 120 is a so-called DRAM, for example, and the non-volatile storage device 130 is a so-called flash memory, for example. The non-volatile storage device 130 stores therein a program 132 that is executed by the processor 110. The processor 110 executes the program 132, thereby implementing a variety of functions. In this illustrative embodiment, the processor 110 implements functions of a data transmission unit 210, a data reception unit 220, a scanner control unit 230, a printer control unit 240 and a processing control unit 250. The respective processing units will be specifically described later. Also, the processor 110 temporarily stores a variety of intermediate data, which is used for execution of the program (for example, the program 132), in the storage device (for example, the volatile storage device 120 or non-volatile storage device 130).

The display unit 140 is a device for displaying an image, and is a liquid crystal monitor, for example. The operation unit 150 is a device for receiving an operation made by a user, and is a touch panel arranged with overlapping over the display unit 140, for example. A user can input a variety of instructions such as an instruction of image processing by operating the operation unit 150. The communication interface 160 is an interface for connection to the network, and is a wireless interface conforming to an IEEE 802.11 a/b/g/n standard, for example. The communication interface 160 is connected to the network 900.

The scanner 170 is an apparatus of optically reading a target such as a document and the like to thus generate image data (also referred to as 'scan data') indicating the target. In this illustrative embodiment, the scanner 170 generates the scan data by using a photoelectric conversion element (for example, a CCD image sensor). The printer 180 is an apparatus of printing an image on a printing medium (for example, a sheet). In this illustrative embodiment, the printer 180 is an inkjet-type printer using respective inks of cyan C, magenta M, yellow Y and black K. However, it should be noted that a printer of another type (for example, a laser-type printer) can be adopted as the printer 180.

The server 400 has a processor 410, a volatile storage device 420, a non-volatile storage device 430 and a communication interface 460. The processor 410 is a data processing device, and is a so-called CPU, for example. The volatile storage device 420 is a so-called DRAM, for example, and the non-volatile storage device 430 is a so-called hard disk drive, for example. The non-volatile storage device 430 stores therein a program 432, which is executed by the processor 410, and template data 434 indicating a template image. The processor 410 executes the program 432, thereby implementing a variety of functions. In this illustrative embodiment, the processor 410 implements functions of a data receiving unit 510, an extraction unit 520, a binarization processing unit 522, a rectangle specifying unit 524, an output data generation unit 530 and a data transmission unit 540. The respective processing units will be specifically described later. Also, the processor 410 temporarily stores a variety of intermediate data, which is used for execution of the program (for example, the program 432), in the storage device (for example, the volatile storage device 420 or non-volatile storage device 430).

The communication interface 460 is an interface for connection to the network, and is a wired interface conforming to an IEEE 802.3 standard, for example. The communication interface 460 is connected to the network 900.

Figure 2:
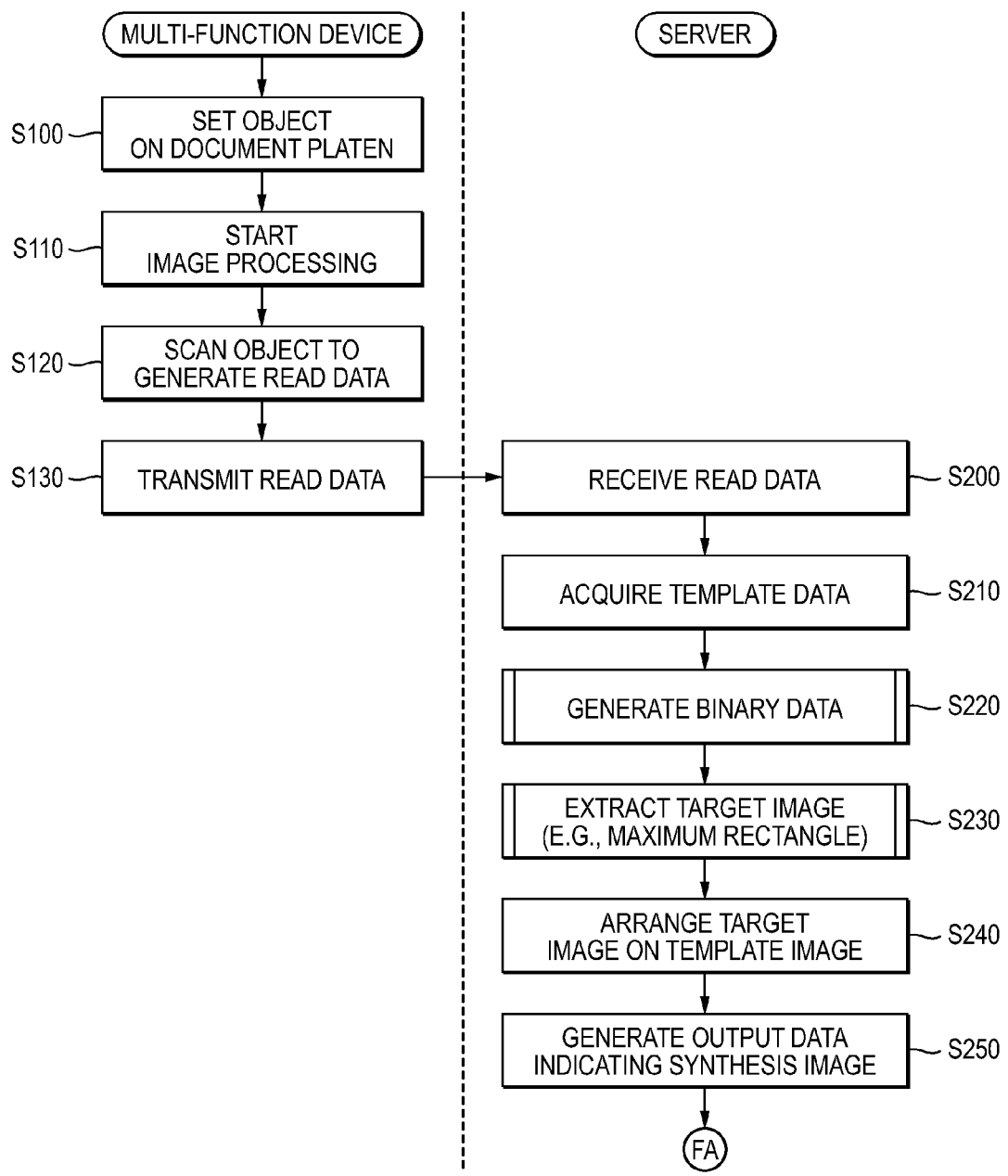
FIG. 2 is a flowchart of image processing.

FIGS. 2 and 3 are flowcharts of image processing that is executed by the image processing system 1000. FIG. 3 follows FIG. 2. In the image processing, a synthesis image is printed on a picture surface of a greeting card. The synthesis image is an image in which a template image and a target image indicating an object prepared by a user are synthesized. Hereinafter, the image processing of FIGS. 2 and 3 is also referred to as 'synthesis image processing'. In FIGS. 2 and 3, processing that is executed in the multi-function device 100 is shown at the left and processing that is executed in the server 400 is shown at the right. In step S100, a user sets an object (for example, a tangible object such as a 'leaf' and a 'handkerchief') on a document platen of the scanner 170 so as to execute the synthesis image processing.

In step S110, the user operates the operation unit 150 of the multi-function device 100 to input a starting instruction of the synthesis image processing. In response to the instruction, the processor 110 of the multi-function device 100 starts the synthesis image processing.

In step S120, the scanner control unit 230 of the multi-function device 100 controls the scanner 170 to scan the object set on the scanner 170, thereby generating read image data indicating the object. Hereinafter, the image indicated by the read image data is referred to as 'read image'. As a format of the read image data, a format including JPEG data indicating the read image is adopted, for example. Also, a pixel density of the read image data is preset (for example, 300 dpi).

Figure 4A:
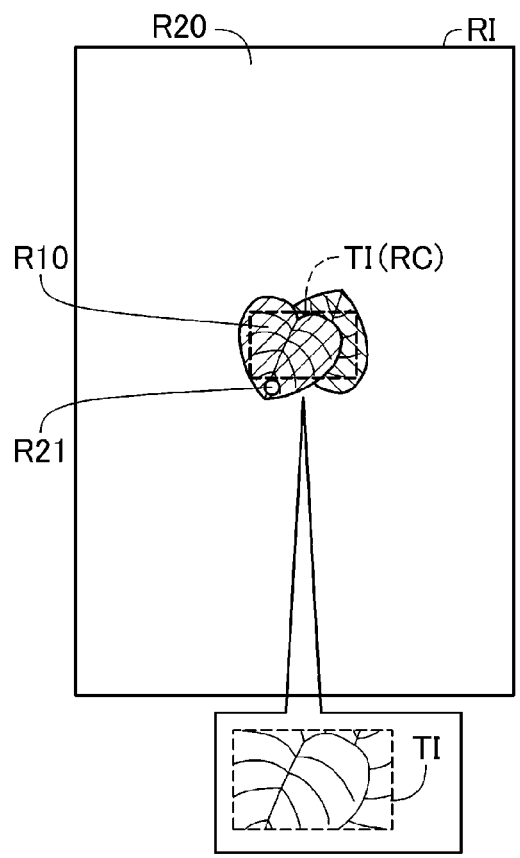
FIGS. 4A and 4B are schematic views illustrating an example of a read image and an example of a final binary image.

FIG. 4A is a schematic view illustrating an example of the read image. The shown read image RI shows, as the object, two leaves that are partially overlapped. Specifically, the read image RI indicates a first area R10 indicating the leaves, a background area R20 indicating a surrounding background of the leaves and a second area R21 indicating a hole of the leaf. Incidentally, in this illustrative embodiment, a size of the read image RI has a predetermined size (for example, a so-called 'A4 size') larger than that of the greeting card.

In step S130 of FIG. 2, the data transmission unit 210 transmits the read image data to the server 400.

In step S200, the data receiving unit 510 of the server 400 receives the read image data. In step S210, the output data generation unit 530 acquires template data indicating the template image. In this illustrative embodiment, one template data 434 that is beforehand determined to be used is acquired from the non-volatile storage device 430.

Figure 5A:
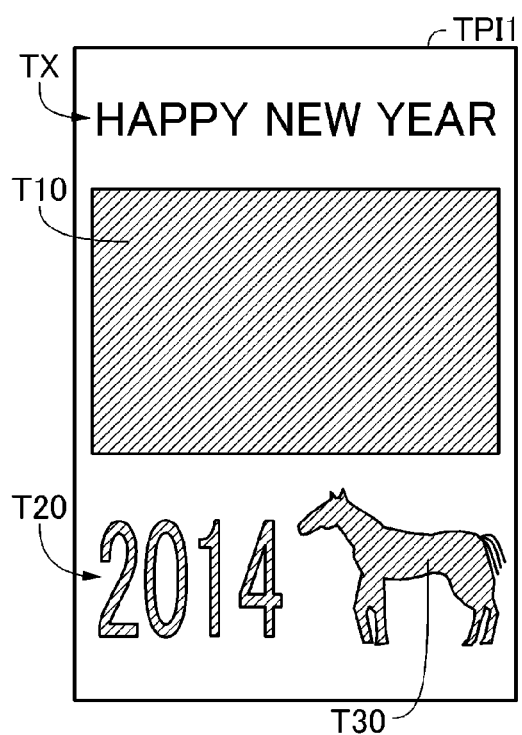
FIGS. 5A to 5C are schematic views illustrating an example of a template image, an arrangement example of a target image and an arrangement example of a synthesis image.

FIG. 5A is a schematic view illustrating an example of the template image. In the example of FIG. 5A, the template image TPI1 has an area indicating a character string TX and three assignment areas T10, T20, T30. The assignment area is an area indicating a target image when the template image TPI1 and the target image are synthesized. The first assignment area T10 is a rectangular area, the second assignment area T20 is an area indicating a four-digit number (here, '2014') indicating a year and the third assignment area T30 is an area indicating an animal (here, a horse). Incidentally, each of the first assignment area T10 and the third assignment area T30 is one continuous area. The second assignment area T20 consists of four areas indicating four numbers. Also, a shape and a size of the template image TPI1 are the same as those of the greeting card. In this illustrative embodiment, the shape is a rectangle and the size is a postcard size.

As a format of the template data, an arbitrary format capable of indicating the template image TPI1 can be adopted. In this illustrative embodiment, the template data is data of a PNG (Portable Network Graphics) format. The assignment area is shows as a transmission area by a so-called alpha channel. The assignment areas T10, T20, T30 are transparent areas (that is, the transparency is 100% (the opacity is zero %)). The other area in the template image TPI1 is an opaque area (i.e., the transparency is zero % (the opacity is 100%)). Also, in this illustrative embodiment, a pixel density of the template image TPI1 is the same as that of the read image data.

Incidentally, the output data generation unit 530 may acquire template data indicating a template image selected by the user from a plurality of template images. For example, the output data generation unit 530 transmits image data indicating a plurality of template images to the multi-function device 100 and the processing control unit 250 of the multi-function device 100 displays the plurality of template images on the display unit 140 by using the received image data. Then, the user inputs an instruction to select one template image through the operation unit 150, and the processing control unit 250 transmits information specifying the selected template image to the server 400. The output data generation unit 530 of the server 400 acquires template data indicating the template image specified by the received information.

Figure 6:
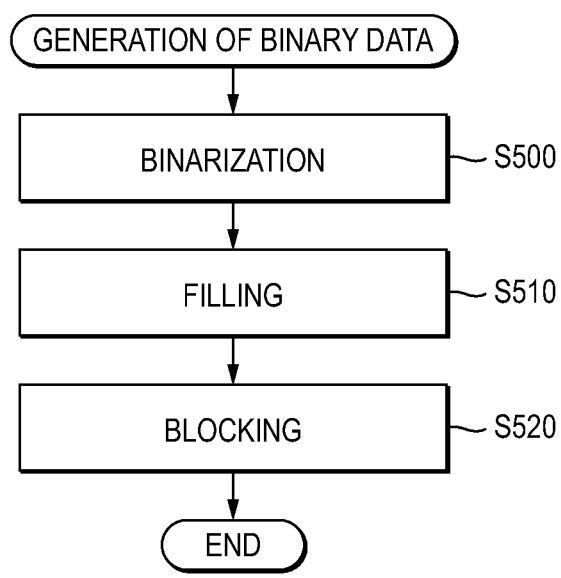
FIG. 6 is a flowchart of binary data generation processing.
Figure 7A:
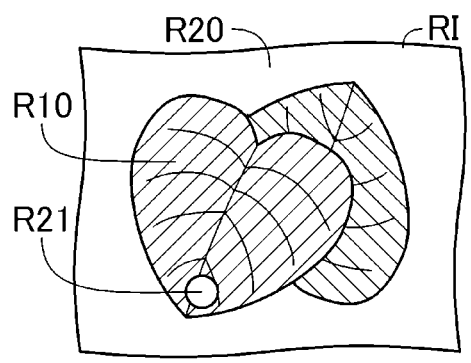
FIGS. 7A to 7D are schematic views illustrating an example of binary data generation.

In step S220 of FIG. 2, the binarization processing unit 522 interprets the read image data to generate binary data. FIG. 6 is a flowchart showing binary data generation processing. FIG. 7 is a schematic view illustrating an example of binary data generation. FIG. 7A illustrates a part including the first area R10, the second area R21 and the background area R20 of the read image RI.

Figure 7B:
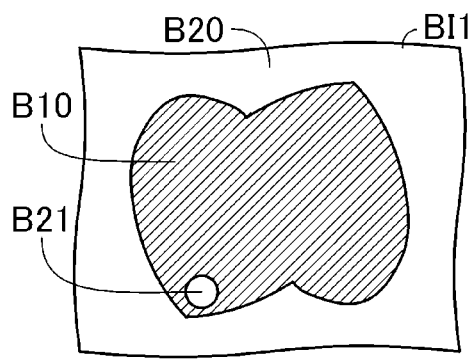

In first step S500 of FIG. 6, the binarization processing unit 522 executes binarization processing of the read image data, thereby generating first binary data. FIG. 7B illustrates an example of a first binary image BI1 indicated by the first binary data. FIG. 7B shows the same part as FIG. 7A. In FIG. 7, a hatched area B10 indicates an area (i.e., on pixels) in which a binarized pixel value is a first value and non-hatched areas B20, B21 indicate areas (i.e., off pixels) in which a binarized pixel value is a second value. In the example of FIG. 7B, the area B10 having the first value is the same as the first area R10 of FIG. 7A. Hereinafter, the area B10 is also referred to as the 'first value area B10'. The areas B20, B21 having the second value are the same as the areas R20, R21 of FIG. 7A, respectively. Hereinafter, the area B20 is also referred to as the 'background area B20' and the area B21 is also referred to as the 'second value area B21'.

As the binarization method, any method of separating an area indicating a background and an area indicating an object can be adopted. For example, in this illustrative embodiment, the binarization processing unit 522 sets, as the second value, a pixel value of a pixel indicating a color in a predetermined background color range including a background color (white, in this illustrative embodiment), and sets, as the first value, a pixel value of a pixel indicating a color beyond the background color range. As the background color range, a color range of red R>220, green G>220 and blue B>200 is adopted. Red R, green G and blue B are pixel values of each pixel of the read image data and are indicated with 256 gradations of 0 to 255.

Figure 7C:
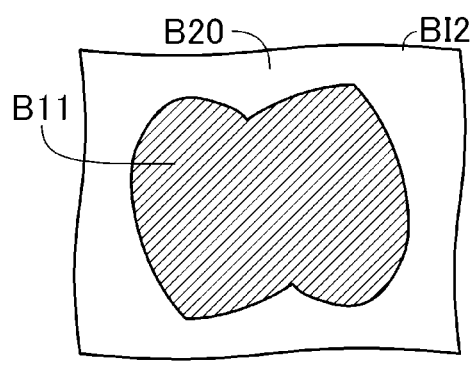

In step S510 of FIG. 6, the binarization processing unit 522 executes filling processing for the first binary data, thereby generating second binary data. FIG. 7C illustrates a second binary image BI2 indicated by the second binary data. FIG. 7C shows the same part as FIG. 7B. The filling processing is processing of changing an area of the background color range, which is surrounded by an area indicating an object, to the area indicating the object. Specifically, a pixel value of the second value area surrounded by the first value area is changed from the second value to the first value. In the example of FIG. 7C, the pixel value of an area B21 surrounded by an area B10 (FIG. 7B) is changed from the second value to the first value. As a result, a continuous area B11 consisting of the area B10 and the area B21 is formed as the first value area. Hereinafter, the area B11 is also referred to as the 'first value area B11'.

As the filling method, a variety of methods can be adopted. For example, a method of changing pixel values of the other areas of the second value area, except for an area abutting on an edge of the first binary image BI1, from the second value to the first value can be adopted.

Figure 7D:
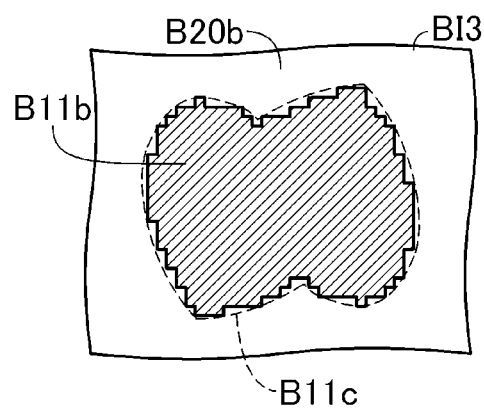

In step S520 of FIG. 6, the binarization processing unit 522 executes blocking processing for the second binary data, thereby generating third binary data. FIG. 7D illustrates a third binary image BI3 indicated by the third binary data. FIG. 7D shows the same part as FIG. 7C. A dotted line B11c in FIG. 7D indicates an outline of the first value area B11 (FIG. 7C).

The blocking processing is processing of dividing a plurality of pixels of an binary image into a plurality of blocks and setting a pixel value to the first or second value for each block. One block includes a plurality of pixels. In this illustrative embodiment, one block is a rectangle area consisting of 20 lines×20 columns pixels. The binarization processing unit 522 divides the entire second binary image BI2 into a plurality of blocks arranged in a lattice shape. The binary image that is formed using one block as one pixel is the third binary image BI3. Hereinafter, a correspondence relation between a pixel position on the second binary image BI2 and a pixel position (i.e., a block position) on the third binary image BI3 is also referred to as a 'block pixel correspondence relation'.

When a number of pixels having the second value is one or more in the plurality of pixels included in one block, the binarization processing unit 522 sets the pixel value of the corresponding block to the second value. When a number of pixels having the second value is zero in the plurality of pixels included in one block, i.e., the pixel values of all pixels are the first value, the binarization processing unit 522 sets the pixel value of the corresponding block to the first value.

In an area relatively closer to a central portion of the first value area B11 (FIG. 7C), a block includes only pixels having the first value. Therefore, in the first value area B11, the pixel value of the block is set to the first value. At an edge part of the first value area B11, a block may include both a pixel of the first value area B11 and a pixel of the background area B20 (hereinafter, referred to as 'mixed block'). A pixel value of the mixed block is set to the second value. In FIG. 7D, a first value area B11b in the third binary image BI3 indicates a remaining area after a part of the edge of the first value area B11 in the second binary image BI2 is removed by the mixed block. Hereinafter, the first value area B11b in the third binary image BI3 is also referred to as the 'first value area B11b'. Also, the second value area B20b in the third binary image BI3' is also referred to as the 'background area B20b'.

In this illustrative embodiment, the binarization processing unit 522 executes the processing of steps S500, S510 and S520, thereby generating the third binary data, as final binary data. Hereinafter, the third binary data is also referred to as the 'final binary data' and the third binary image BI3 indicated by the third binary data is also referred to as the 'final binary image BI3'. The first value area B11b in the final binary image BI3 corresponds to an area indicating the object (hereinafter, also referred to as the 'object area B11b'). When the final binary data is generated, the processing of FIG. 6 is over.

Figure 4B:
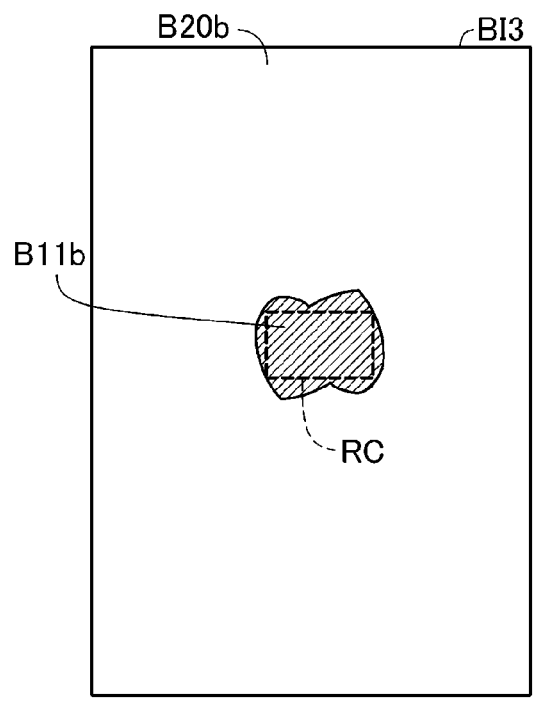

In step S230 of FIG. 2, the rectangle specifying unit 524 specifies a target rectangle area inscribed in the object area of the final binary image and the extraction unit 520 extracts a target image that is an image of the target rectangle area in the read image. FIG. 4B is a schematic view illustrating an example of the final binary image BI3. In FIG. 4B, a target rectangle area RC is shown. The target rectangle area RC is inscribed in the object area B 1 1b. Incidentally, a pixel density of the final binary image BI3 is lower than the pixel density (which is the same as the pixel density of the read image RI of FIG. 4A) of the second binary image BI2 of FIG. 7C. Like this, the final binary image BI3 of which the pixel density is lowered, as compared to the read image RI, is used to specify the target rectangle area RC. Therefore, as compared to a configuration where the binary data (for example, the second binary data indicating the second binary image BI2) having a larger pixel density is used, it is possible to reduce an amount of calculation of the processing of specifying the target rectangle area RC. As a result, it is possible to specify the target rectangle area RC at high speed. Incidentally, the processing of specifying the target rectangle area RC will be specifically described later.

FIG. 4A illustrates a target image TI that is an image of an area corresponding to the target rectangle area RC in the read image RI. A position of the target rectangle area RC on the read image RI is specified in accordance with the above-described block pixel correspondence relation. The target image TI is an image of an area surrounded by an outline of the target rectangle area RC. At a lower part of FIG. 4A, an enlarged view of the target image TI is shown. As shown, the target image TI shows a part of the object (here, leaves').

Figure 5B:
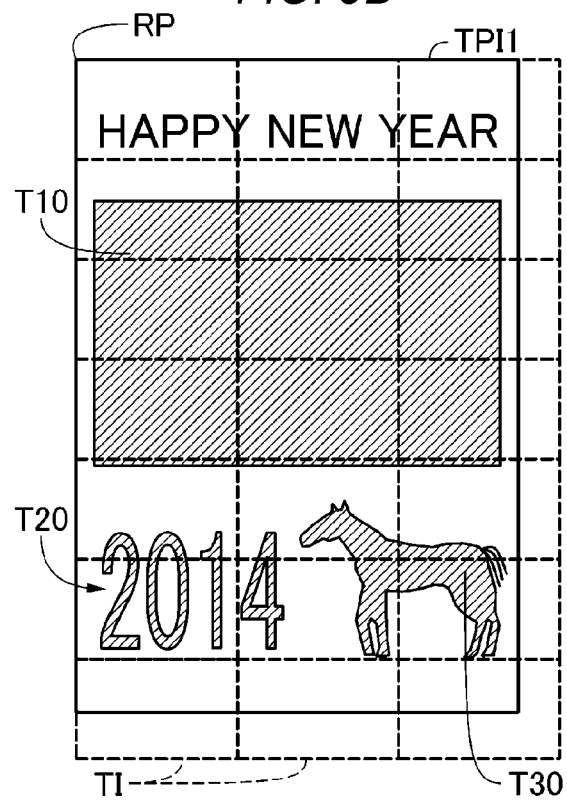

In step S240 of FIG. 2, the output data generation unit 530 determines arrangement of the target image with respect to the template image. FIG. 5B is a schematic view illustrating an arrangement example of the target image. In FIG. 5B, a plurality of target images TI arranged on the template image TPI1 is shown with rectangle dotted lines indicating outlines of the target images TI. In this illustrative embodiment, the output data generation unit 530 determines the arrangement of the plurality of target images TI so that the target images TI are arranged continuously over the entire template image TPI1 on the basis of a left-upper corner RP of the template image TPI1. Specifically, the plurality of target images TI is arranged in a lattice shape without a gap (i.e., continuously) so that a left-upper corner of the target image TI coincides with the corner RP of the template image TPI1. In this illustrative embodiment, the target images TI are superimposed on the template image TPI1 so that a plurality of continuous pixels in the target images TI is superimposed one-on-one on the same number of continuous pixels in the template image TPI1.

Figure 5C:
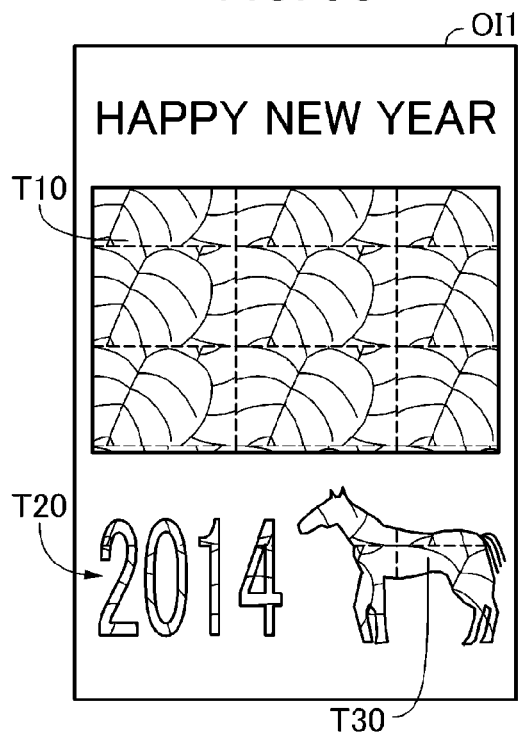

In step S250 of FIG. 2, the output data generation unit 530 generates output data indicating a synthesis image in which the template image and the target images are synthesized. FIG. 5C is a schematic view illustrating an example of the synthesis image. When the plurality of target images TI is arranged on the template image TPI1 in accordance with the arrangement determined in step S240, the output data generation unit 530 adopts parts of the plurality of target images TI overlapping with the assignment areas T10, T20, T30, as images of the assignment areas T10, T20, T30. In the synthesis image OI1 of FIG. 5C, each of the assignment areas T10, T20, T30 is indicated by the plurality of target images TI.

Incidentally, as a format of the output data, a format including JPEG data indicating the synthesis image is adopted, for example. Also, the output data includes data, which designates a size (here, a postcard size) of the greeting card as a size of a printing medium. Also, a pixel density of the synthesis image is the same as that of the template image.

When the generation of the output data is completed, the output data generation unit 530 inquires of the multi-function device 100 whether a trial printing is necessary or not in step S310 of FIG. 3. The trial printing is to print the synthesis image on a sheet different from a sheet of the greeting card before printing the synthesis image on the sheet of the greeting card. In step S320, the processing control unit 250 of the multi-function device 100 transmits a reply to the server 400, in response to a user's instruction. For example, the processing control unit 250 displays a message inquiring whether a trial printing is necessary or not on the display unit 140, receives an instruction input through the operation unit 150 and transmits a replay to the server 400, in response to the instruction. In step S330, the output data generation unit 530 of the server 400 determines whether the reply from the multi-function device 100 indicates the trial printing. When the reply does not indicate the trial printing (S330: No), the data transmission unit 540 transmits the output data to the multi-function device 100 in step S390. The printer control unit 240 of the multi-function device 100 generates print data by using the received output data and supplies the generated print data to the printer 180. The printer 180 prints the synthesis image, based on the print data. The user sets the greeting card (for example, a New Year's card) on the printer 180 in advance, as the printing medium. The printer 180 prints the synthesis image on the set greeting card.

Incidentally, as the method of generating the print data, any method suitable for the printer 180 can be adopted. For example, the printer control unit 240 converts a color of the output data, performs halftone processing by using the color-converted data and generates print data in accordance with a result of the halftone processing. The color-converted data is data indicating a color with gradation values of respective color materials (for example, color materials of cyan, magenta, yellow and black) that can be used by the printer 180.

When the reply from the multi-function device 100 indicates the trial printing (S330: Yes), the output data generation unit 530 generates trial data, which is data for enabling the multi-function device 100 to execute the trial printing of the synthesis image, in step S340. In this illustrative embodiment, the trail data indicates the synthesis image and includes the same JPEG data as the output data. Also, data, which designates a size of the printing medium included in the trial data, designates a predetermined size larger than the postcard size. As the size, a typical size (A4 size, in this illustrative embodiment) of a normal sheet that is widely spread as a printing sheet is adopted. In step S350, the data transmission unit 540 transmits the trial data to the multi-function device 100. The printer control unit 240 of the multi-function device 100 generates print data by using the received trial data and supplies the generated print data to the printer 180 in step S360. The printer 180 prints a trial image, based on the print data.

Figure 8:
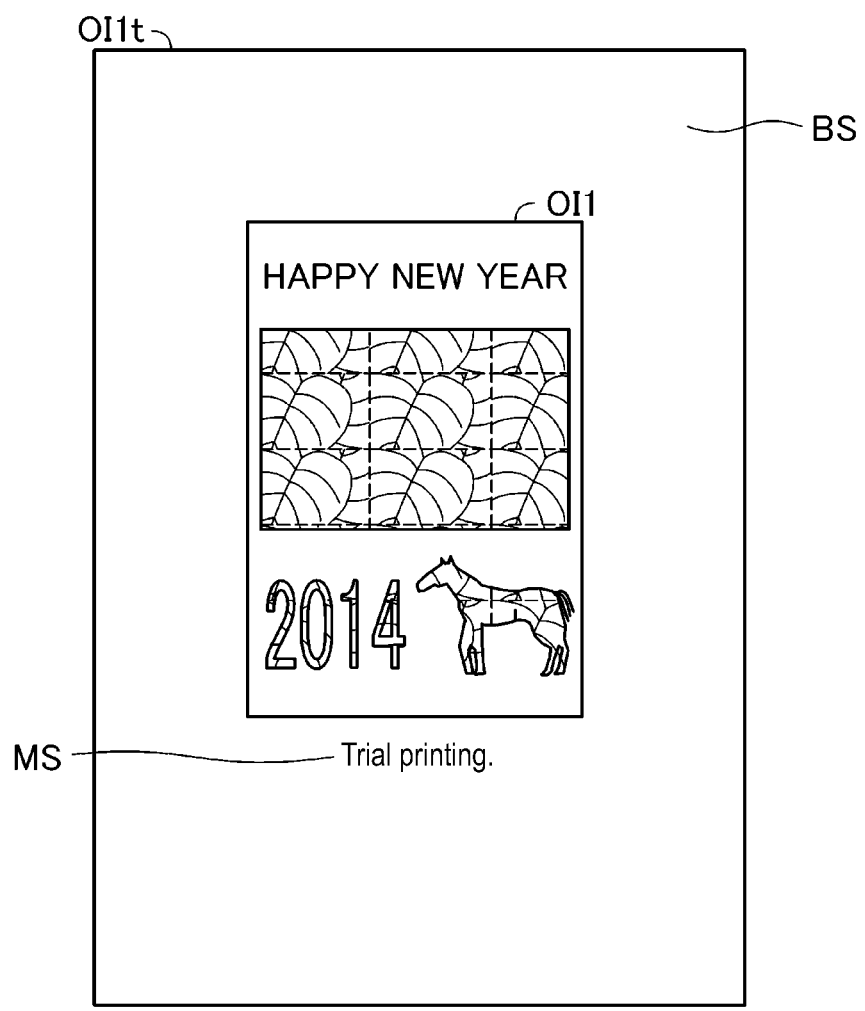
FIG. 8 is a schematic view illustrating an example of a trial image OI1t.

FIG. 8 is a schematic view illustrating an example of a trial image OI1$t$ that is an image indicated by the trail data. In the example of FIG. 8, the trial image OI1$t$ indicates the synthesis image OI1 and a message MS. The message MS indicates that the printing of the trial image OI1$t$ is the trial printing. Incidentally, a size of the synthesis image OI1, which is included in the trial image OI1$t$ when the trial image OI1$t$ is printed, is the same as the size of the synthesis image OI1 when the synthesis image OI1 is printed on the sheet of the greeting card on the basis of the output data. Therefore, the user can easily determine whether the synthesis image OI1 is appropriate or not by observing the printed trial image OI1$t$. Also, the trial image OI1$t$ is printed on a printing medium larger than the printing medium that is used for the printing based on the output data. Thus, a blank BS is arranged at the periphery of the synthesis image OI1. As a result, it is possible to arrange the message MS without reducing the size of the synthesis image OI1. Also, the user can insert a correction of the synthesis image OI1 in the black BS. Also, the size of the printing medium that is used for the printing of the trial image OI1$t$ is set to the typical size (A4 size, in this illustrative embodiment) of the normal sheet that is widely spread as a printing sheet. Therefore, when printing the trial image OI1$t$, it is possible to use the inexpensive normal sheet, instead of the expensive greeting card. Incidentally, the size of the synthesis image OIL which is included in the trial image OI1$t$ when the trial image OI1$t$ is printed, may be larger than the size of the synthesis image OI1 when the synthesis image OI1 is printed on the basis of the output data. By doing so, the user can easily determine whether the synthesis image OI1 is appropriate or not by observing the largely printed trial image OI1$t$.

The user determines whether or not to print the synthesis image on the greeting card, in accordance with the observation result of the printed trial image OI1$t$. Then, in step S370 of FIG. 3, the user inputs an instruction, which indicates whether or not to perform a printing, through the operation unit 150. The processing control unit 250 transmits an instruction, which indicates whether or not to perform a printing, to the server 400, in response to the user's instruction. In step S380, the data transmission unit 540 of the server 400 determines whether the received instruction indicates a printing. When the instruction indicates that a printing is to be executed (S380: YES), the data transmission unit 540 transmits the output data to the multi-function device 100 in step S390 and the printer control unit 240 of the multi-function device 100 prints an output image, in accordance with the received output data, in step S400. When the instruction does not indicate that a printing is to be executed (S380: No), the data transmission unit 540 ends the processing of FIGS. 2 and 3 without transmitting the output data to the multi-function device 100.

As described above, in this illustrative embodiment, the two or more target images TI are arranged on the one continuous assignment area (for example, the assignment area T10 of FIG. 5C). Therefore, the output data generation unit 530 can easily generate the output data indicating the synthesis image OI1 in which the target images TI and the template image TPI1 are synthesized. Also, in this illustrative embodiment, since the two or more target images TI are arranged on the assignment area, it is possible to suppress the blank part in the assignment area from being large.

On the other hand, when the target image TI is smaller than one assignment area (for example, the assignment area T10), i.e., one target image TI cannot cover the one entire assignment area, the output data generation unit 530 arranges the two or more target images TI on the corresponding assignment area. When the target image TI is larger than one assignment area, i.e., one target image TI can cover the one entire assignment area, the number of the target images TI to be arranged on the corresponding assignment area is preferably one.

Figure 9:
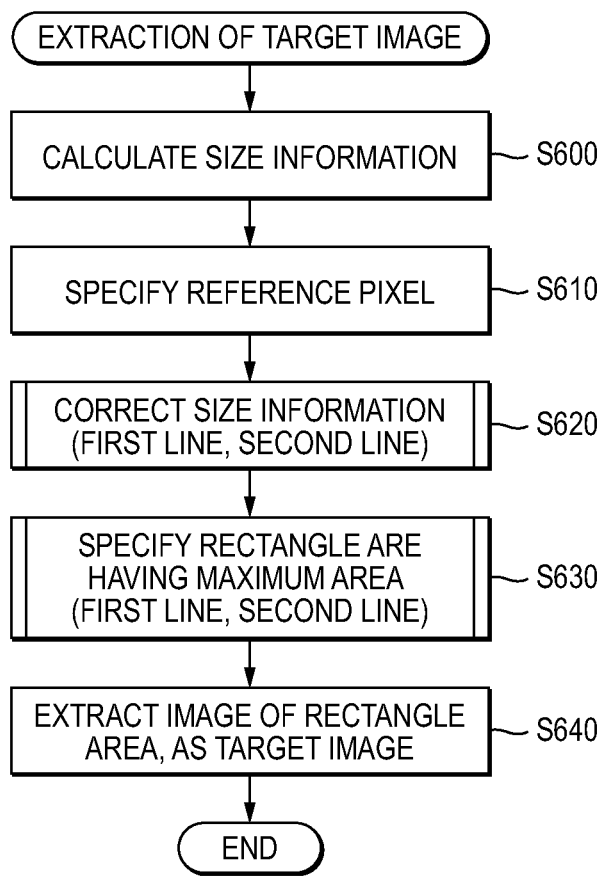
FIG. 9 is a flowchart of target image extraction processing.

Also, as described in FIGS. 5B and 5C, when the plurality of target images TI is arranged to be continuously aligned over the entire template image TPI1 on the basis of the reference position (the corner RP) associated with the template image TPI1, the output data generation unit 530 uses the two or more target images TI overlapping with the assignment area (for example, the assignment area T10) for generation of the synthesis image. Therefore, since the output data generation unit 530 can easily determine the respective arrangements of the two or more target images TI on the assignment area, it can easily generate the output data indicating the synthesis image OIL Subsequently, extraction of the target image (specifically, specifying of the target rectangle area) will be described. FIG. 9 is a flowchart of extraction processing of the target image to be executed in step S230 of FIG. 2. Hereinafter, a case will be described in which the target rectangle area RC, i.e., the target image TI is extracted from the object area B11$b$ described in FIGS. 4 and 7D.

Figure 10:
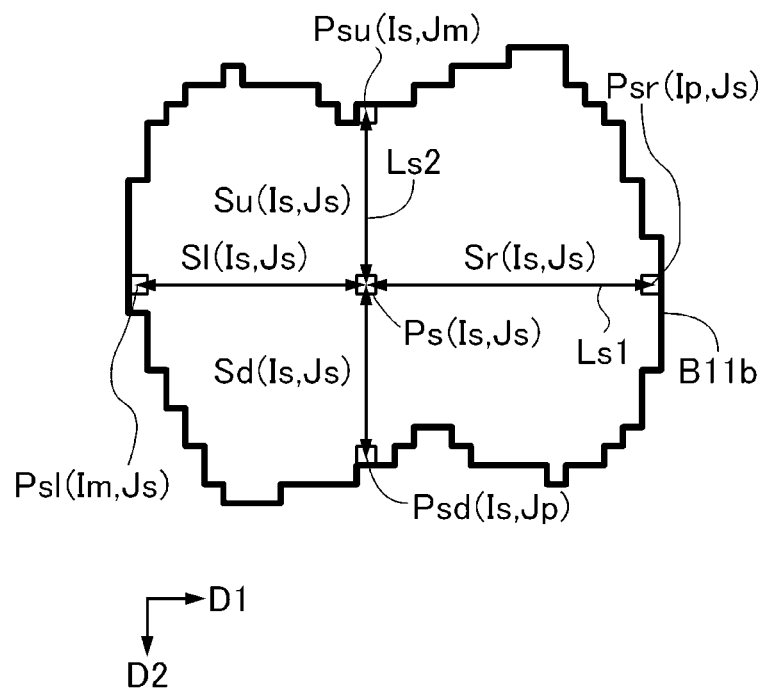
FIG. 10 illustrates size information.

In step S600, the rectangle specifying unit 524 calculates size information for each pixel included in the object area B11$b$. FIG. 10 illustrates the size information. In FIG. 10, the object area B11$b$ described in FIG. 7D is shown. Also, in FIG. 10, two directions D1, D2 orthogonal to each other are shown. The object area B11$b$, and further the plurality of pixels of the final binary image BI3 is arranged in a lattice shape along the first direction D1 and the second direction D2. Hereinafter, the first direction D1 is also referred to as a 'right direction' and the second direction D2 is also referred to as a 'lower direction'.

In FIG. 10, a pixel Ps (hereinafter, referred to as an 'attention pixel Ps') selected from the object area B11$b$ and a first line Ls1 and a second line Ls2 passing the attention pixel Ps and being orthogonal to each other are shown. The first line Ls1 is parallel with the first direction D1 and the second line Ls2 is parallel with the second direction D2.

A right end pixel Psr is arranged at the first direction D1-side of the attention pixel Ps and a left end pixel Psl is arranged at an opposite side of the attention pixel Ps. The two end pixels Psr, Psl are pixels that are arranged at two intersection positions of the outline (i.e., the edge) of the object area B11b and the first line Ls1.

A lower end pixel Psd is arranged at the second direction D2-side of the attention pixel Ps and an upper end pixel Psu is arranged at an opposite side of the attention pixel Ps. The two end pixels Psd, Psu are pixels that are arranged at two intersection positions of the outline (i.e., the edge) of the object area B11b and the second line Ls2.

Incidentally, in FIG. 10, values in a parenthesis close to the reference numeral (for example, the reference numeral Ps indicating a pixel) indicate a pixel position in the first direction D1 and a pixel position in the second direction D2 sequentially from the left. For example, a pixel position of the attention pixel Ps in the first direction D1 is denoted with 'Is', and a pixel position in the second direction D2 is denoted with 'Js'. Hereinafter, a pixel position beginning with 'I' indicates a pixel position in the first direction D1, and a pixel position beginning with 'J' indicates a pixel position in the second direction D2. Also, a pixel position in the first direction D1 increases by 1 towards the first direction D1, and a pixel position in the second direction D2 increases by 1 towards the second direction D2.

In FIG. 10, four numbers of pixels Sr, Sl, Sd, Su are shown between the attention pixel Ps and the four end pixels Psr, Psl, Psd, Psu. Specifically, 1) The number of right pixels Sr is a number of pixels between the attention pixel Ps and the right end pixel Psr and is a difference between a position Ip of the right end pixel Psr and a position Is of the attention pixel Ps.

2) The number of left pixels Sl is a number of pixels between the attention pixel Ps and the left end pixel Psl and is a difference between the position Is of the attention pixel Ps and a position Im of the left end pixel Psl.

3) The number of lower pixels Sd is a number of pixels between the attention pixel Ps and the lower end pixel Psd and is a difference between a position Jp of the lower end pixel Psd and a position Js of the attention pixel Ps.

4) The number of upper pixels Su is a number of pixels between the attention pixel Ps and the upper end pixel Psu and is a difference between the position Js of the attention pixel Ps and a position Jm of the upper end pixel Psu.

The rectangle specifying unit 524 calculates the four numbers of pixels Sr, Sl, Sd, Su as the size information of the attention pixel Ps. In this illustrative embodiment, the rectangle specifying unit 524 calculates the size information for all pixels included in the object area B11b.

In step 910 of FIG. 9, the rectangle specifying unit 524 specifies a reference pixel. In this illustrative embodiment, the rectangle specifying unit 524 selects, as the reference pixel, a pixel having a maximum sum value of the four numbers of pixels Sr, Sl, Sd, Su, which are calculated as the size information, of the plurality of pixels in the object area B11b. Hereinafter, it is assumed that the attention pixel Ps of FIG. 10 is selected as the reference pixel.

Figure 11:
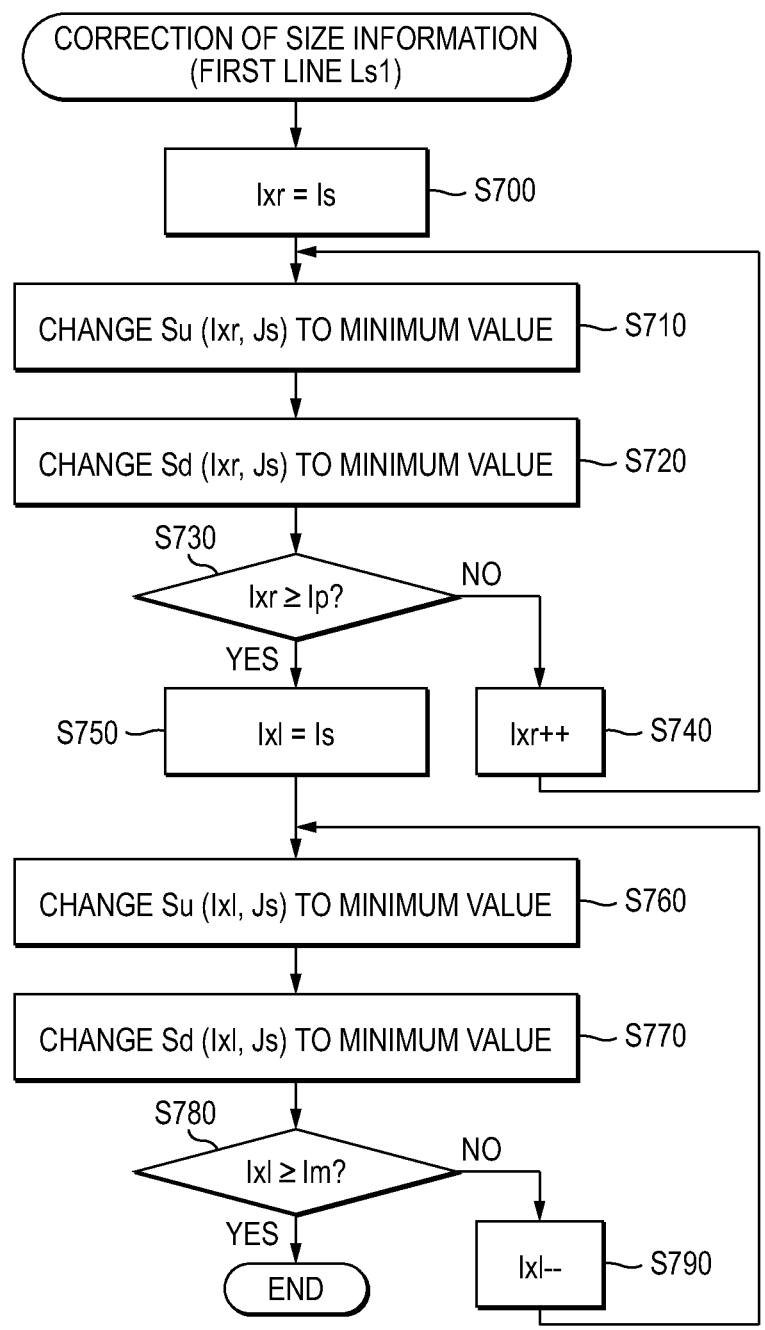
FIG. 11 is a flowchart of size information correction processing.

In step S620 of FIG. 9, the rectangle specifying unit 524 corrects the calculated size information. FIG. 11 is a flowchart of processing of correcting the size information. As described later, the correction of the size information is performed for each pixel on the first line Ls1 and the second line Ls2. FIG. 11 shows processing for the pixel on the first line Ls1.

Figures 12A, 12B:
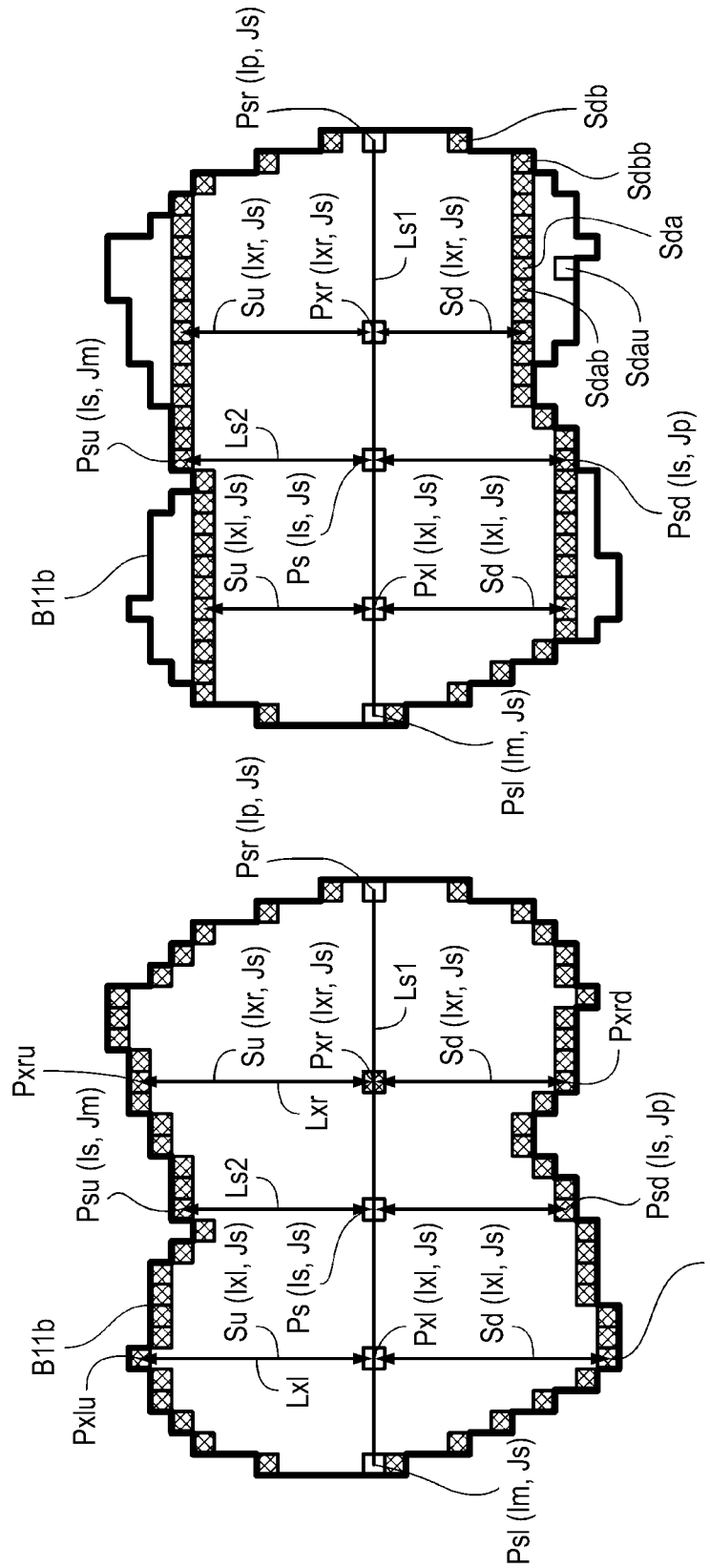
FIGS. 12A and 12B illustrate an example of size information correction.

FIG. 12 illustrates an example of the correction of the size information by the processing of FIG. 11. In the processing of FIG. 11, the number of lower pixels Sd and the number of upper pixels Su of the pixel (referred to as the attention pixel) on the first line Ls1 passing the reference pixel Ps are corrected. The hatched pixels in FIG. 12 indicate pixels located at positions deviating from each attention pixel on the first line Ls1 by the numbers of pixels Sd, Su. FIG. 12A shows a state before the correction and FIG. 12B shows a state after the correction.

In FIG. 12B, five numbers of lower pixels Sda, Sdab, Sdau, Sdb, Sdbb are shown at a right-left part of the object area B11b by the reference numerals indicating the corresponding pixels. An outline is described using the numbers of lower pixels. Following the pixels on the first line Ls1 from the reference pixel Ps to the right end pixel Psr, the corrected number of lower pixels Sd is set to be the same as or to be smaller than the corrected number of lower pixels Sd of the one-before pixel. Specifically, as shown in the first number of lower pixels Sda, when the number of lower pixels Sdau before the correction is equal to or larger than the corrected number of lower pixels Sdab of the one-before pixel, the number of lower pixels Sda is set to be the same as the corrected number of lower pixels Sdab of the one-before pixel. As shown in the second number of lower pixels Sdb, when the number of lower pixels Sdb before the correction is smaller than the corrected number of lower pixels Sdbb of the one-before pixel, the number of lower pixels Sdb is maintained. The correction of the number of upper pixels Su is also the same. In this way, the correction is performed in accordance with the flowchart of FIG. 11.

In steps S700 to S740 of FIG. 11, the rectangle specifying unit 524 corrects the size information Sd, Su of the attention pixel Pxr (also referred to as 'right attention pixel Pxr') one pixel by one pixel sequentially from the reference pixel Ps to the right end pixel Psr. In step S700, the rectangle specifying unit 524 initializes a position Ixr of the attention pixel Pxr in the first direction D1 to the position Is of the reference pixel Ps. In step S710, the rectangle specifying unit 524 changes the number of upper pixels Su of the attention pixel Pxr to a minimum value of the number of upper pixels Su from the reference pixel Ps to the attention pixel Pxr. In step S720, the rectangle specifying unit 524 changes the number of lower pixels Sd of the attention pixel Pxr to a minimum value of the number of lower pixels Sd from the reference pixel Ps to the attention pixel Pxr. In step S730, the rectangle specifying unit 524 determines whether the processing for all pixels from the reference pixel Ps to the right end pixel Psr is over or not. In this illustrative embodiment, when the position Ixr of the attention pixel Pxr is the position Ip or larger of the right end pixel Psr, it is determined that the processing is over. When a pixel for which the processing is not performed yet remains (S730: No), the rectangle specifying unit 524 adds 1 to the position Ixr of the attention pixel Pxr in step S740 and returns to step S710. When the processing for all pixels from the reference pixel Ps to the right end pixel Psr is over (S730: Yes), the processing proceeds to step S750.

In steps S750 to S790 of FIG. 11, the rectangle specifying unit 524 corrects the size information Sd, Su of the attention pixel Pxl (also referred to as 'left attention pixel Pxl') one pixel by one pixel sequentially from the reference pixel Ps to the left end pixel Psl. The sequence of steps S750 to S790 is the same as the sequence in which the sequence of steps S700 to S740 is corrected so that the attention pixel Pxl moves from the reference pixel Ps towards the left end pixel Psl. That is, in step S750, the position Ixl of the attention pixel Pxl is initialized to the position Is of the reference pixel Ps. In step S760, the number of upper pixels Su of the attention pixel Pxl is changed to a minimum value of the number of upper pixels Su from the reference pixel Ps to the attention pixel Pxl. In step S770, the number of lower pixels Sd of the attention pixel Pxl is changed to a minimum value of the number of lower pixels Sd from the reference pixel Ps to the attention pixel Pxl. In step S780, it is determined whether the processing for all pixels from the reference pixel Ps to the left end pixel Psl is over or not. When a pixel for which the processing is not performed yet remains (S780: No), 1 is subtracted from the position Ixl of the attention pixel Pxl in step S790 and the processing returns to step S760. When the processing for all pixels from the reference pixel Ps to the left end pixel Psl is over (S780: Yes), the processing of FIG. 11 is over.

As described above, the number of lower pixels Sd and the number of upper pixels Su of each pixel on the first line Ls1 are corrected. The rectangle specifying unit 524 also corrects the number of right pixels Sr and the number of left pixels Sl for each pixel on the second line Ls2. The correction of the numbers of pixels Sr, Sl is performed in accordance with the same sequence as that of the correction of the numbers of pixels Sd, Su. That is, the attention pixel is selected one by one sequentially from the reference pixel Ps towards the lower end pixel Psd, and the number of right pixels Sr and the number of left pixels Sl of the selected attention pixel are corrected. The attention pixel is selected one by one sequentially from the reference pixel Ps towards the upper end pixel Psu, and the number of right pixels Sr and the number of left pixels Sl of the selected attention pixel are corrected. Incidentally, the end pixels Psr, Psl, Psd, Psu are last pixels (also referred to as the 'last pixels Psr, Psl, Psd, Psu) of the processing of correcting the numbers of pixels Sd, Su, Sr, Sl.

In step S630 of FIG. 9, the rectangle specifying unit 524 specifies, as a target rectangle area, a rectangle area having a maximum area from a plurality of rectangle areas having two sides (referred to as 'two sides based on the first line Ls1') passing two pixels selected on the first line Ls1 and a plurality of rectangle areas having two sides (referred to as 'two sides based on the second line Ls2') passing two pixels selected on the second line Ls2. In step S640, the extraction unit 520 extracts, as a target image, an image of an area corresponding to the target rectangle area from the read image. In the example of FIG. 4A, the target image TI corresponding to the target rectangle area RC is extracted from the read image RI. In this illustrative embodiment, a pixel density of the read image RI is larger than that of the target rectangle area RC (i.e., the final binary image BI3 of FIG. 4B). The extraction unit 520 specifies an area on the read image RI, which corresponds to the target rectangle area RC, in accordance with the above-described block pixel correspondence relation. For example, when one pixel (also referred to as a 'block') of the final binary image BI3 is indicated with 20 lines by 20 columns pixels of the read image RI, the extraction unit 520 twenty times a pixel position (a pixel position of a low pixel density) of the block on the final binary image BI3 to thus calculate a position (a pixel position of a high pixel density) of an end of the block on the read image RI.

Figure 13:
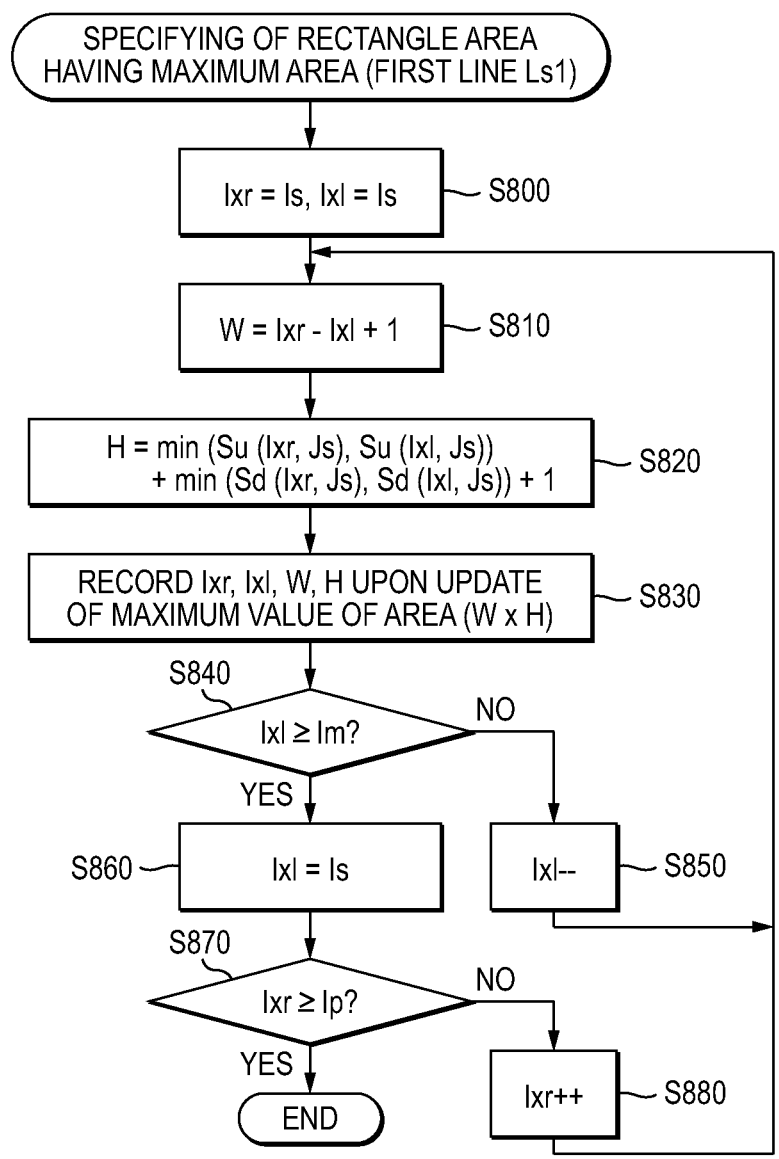
FIG. 13 is a flowchart of processing for specifying a rectangular area having a maximum area.
Figure 14:
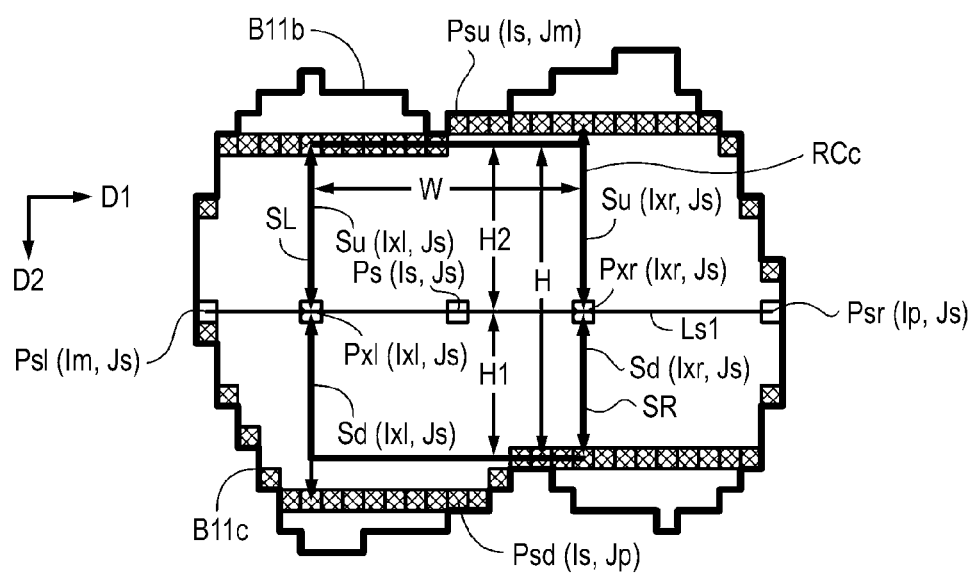
FIG. 14 is a schematic view of the rectangular area that is processed in accordance with a sequence of FIG. 13.

Subsequently, the processing of specifying the rectangle area having a maximum area will be described. FIG. 13 is a flowchart showing processing of specifying the rectangle area having a maximum area from the plurality of rectangle areas having two sides based on the first line Ls1. FIG. 14 is a schematic view of the rectangle area that is processed in accordance with the sequence of FIG. 13. Referring to FIG. 14, the plurality of rectangle areas having two sides based on the first line Ls1 will be described.

The rectangle specifying unit 524 selects an attention pixel Pxr (also referred to as a 'first pixel Pxr') positioned at the first direction D1-side, when seen from the reference pixel Ps, and an attention pixel Pxl (also referred to as a 'second pixel Pxl') positioned at the opposite side, when seen from the reference pixel Ps, from the plurality of attention pixels on the first line Ls1. Then, the rectangle specifying unit 524 adopts a rectangle area, which has a side SR (also referred to as a 'first side SR') passing the first pixel Pxr and being orthogonal to the first line Ls1 and a side SL (also referred to as a 'second side SL') passing the second pixel Pxl and being orthogonal to the first line Ls1 and is inscribed in an outline B11c of the object area B11b, as a candidate of the target rectangle area (hereinafter, referred to as a 'candidate rectangle area RCc').

A position Ixr of the first pixel Pxr (i.e., the first side SR) in the first direction D1 is variable between the position Is of the reference pixel Ps and the position Ip of the right end pixel Psr. Likewise, a position Ixl of the second pixel Pxl (i.e., the second side SL) in the first direction D1 is variable between the position Is of the reference pixel Ps and the position Im of the left end pixel Psl. Therefore, a plurality of combinations of the first side SR and the second side SL, i.e., a plurality of rectangle area candidates is defined on the basis of the first line Ls1. The rectangle specifying unit 524 specifies a rectangle area having a maximum area from the plurality of rectangle area candidates in accordance with the sequence of FIG. 13.

In step S800 of FIG. 13, the rectangle specifying unit 524 initializes the position Ixr of the first pixel Pxr in the first direction D1 and the position Ixl of the second pixel Pxl in the first direction D1 to the position Is of the reference pixel Ps. In step S810, the rectangle specifying unit 524 calculates a width W of the candidate rectangle area RCc in the first direction D1 by using a difference between the position Ixr of the first pixel Pxr and the position Ixl of the second pixel Pxl (W=Ixr-Ixl+1).

In step S820, the rectangle specifying unit 524 calculates a height H of the candidate rectangle area RCc in the second direction D2. The height H is calculated using a first part height H1, which is a height of a part of the second direction D2-side than the first line Ls1, and a second part height H2, which is a height of a part of the opposite side of the first line Ls1. The first part height H1 is a smaller value (min(Sd(Ixr, Js), Sd(Ixl, Js))) of the number of lower pixels Sd of the first pixel Pxr and the number of lower pixels Sd of the second pixel Pxl. The second part height H2 is a smaller value (min (Su(Ixr, Js), Su(Ixl, Js))) of the number of upper pixels Su of the first pixel Pxr and the number of upper pixels Su of the second pixel Pxl. Considering a thickness (1) of the first line Ls1, the height H is indicated with H1+H2+1.

Incidentally, the first part height H1 defines a side of the four sides of the rectangle area RCc, which is parallel with the first line Ls1, and the second part height H2 defines another side of the four sides of the rectangle area RCc, which is parallel with the first line Ls1. In this way, the rectangle area RCc inscribed in the object area B11b is specified by the position Ixr of the first pixel Pxr, the position Ixl of the second pixel Pxl, the first part height H1 and the second part height H2.

In step S830 of FIG. 13, the rectangle specifying unit 524 calculates an area of the candidate rectangle area RCc by multiplying the width W and the height H. Then, the rectangle specifying unit 524 stores a maximum value of the area and information (for example, Ixr, Ixl, W, H and the like) specifying the candidate rectangle area RCc having a maximum area in the storage device (in this illustrative embodiment, the volatile storage device 420). As described later, the processing of steps S810 to S830 is executed for each of the plurality of candidate rectangle areas RCc. In step S830, the rectangle specifying unit 524 updates the maximum area data so that it indicates data associated with the maximum area of the areas calculated in step S830.

In step S840, the rectangle specifying unit 524 determines whether the processing for all second pixels Pxl (i.e., the second side SL) from the reference pixel Ps to the left end pixel Psl is over. In this illustrative embodiment, when the position Ixl of the second pixel Pxl (i.e., the second side SL) is the position Im or smaller of the left end pixel Psl, it is determined that the processing is over. When the second side SL for which the processing is not performed yet remains (S840: No), the rectangle specifying unit 524 subtracts 1 from the position Ixl of the second pixel Pxl in step S850 and returns to step S810.

When the processing for all second side SL from the reference pixel Ps to the left end pixel Psl is over (S840: Yes), the rectangle specifying unit 524 initializes the position Ixl of the second side SL to the position Is of the reference pixel Ps in step S860 and determines in step S870 whether the processing for all first pixels Pxr (i.e., the first side SR) from the reference pixel Ps to the right end pixel Psr is over. In this illustrative embodiment, when the position Ixr of the first pixel Pxr (i.e., the first side SR) is the position Ip or larger of the right end pixel Psr, it is determined that the processing is over. When the first side SR for which the processing is not performed yet remains (S870: No), the rectangle specifying unit 524 adds 1 to the position Ixr of the first pixel Pxr in step S880 and returns to step S810. When the processing for all first side SR from the reference pixel Ps to the right end pixel Psr is over (S870: Yes), the processing of FIG. 13 is over.

As described above, the rectangle specifying unit 524 calculates the areas of the candidate rectangle areas RCc for all combinations of the first pixel Pxr and the second pixel Pxl, i.e., all combinations of the first side SR and the second side SL, and updates the maximum area data. The rectangle specifying unit 524 also calculates the respective areas of the plurality of rectangle areas having two sides based on the second line Ls2, and updates the maximum area data. Then, the rectangle specifying unit 524 specifies the rectangle area having a maximum area, as the target rectangle area. Incidentally, the respective areas of the plurality of rectangle areas having two sides based on the second line Ls2 are calculated in accordance with the same sequence as FIG. 13. That is, the first side parallel with the first direction D1 is selected from between the reference pixel Ps and the lower end pixel Psd, and the second side parallel with the first direction D1 is selected from between the reference pixel Ps and the upper end pixel Psu. Then, the candidate rectangle area is specified and the area is calculated by using the number of right pixels Sr and the number of left pixels Sl.

As described above, according to this illustrative embodiment, the rectangle specifying unit 524 specifies the rectangle area having a maximum area by using the first line Ls1 and the second line Ls2. That is, as described in FIGS. 13 and 14, the rectangle specifying unit 524 specifies, as the target rectangle area, a rectangle area having a maximum area from a plurality of rectangle areas having a first side, which passes a pixel, which is positioned at one side when seen from the reference pixel Ps, of a plurality of pixels overlapping with a specific line (for example, the first line Ls1) passing the reference pixel Ps in the object area B11b and is orthogonal to the specific line, and a second side, which passes a pixel positioned at an opposite side when seen from the reference pixel Ps and is orthogonal to the specific line. Therefore, it is possible to easily specify the target rectangle area inscribed in the object area B11b. Also, compared to a configuration where any two pixels overlapping with the specific line are selected as the two pixels defining the first side and second side, it is possible to reduce the number of candidates of the target rectangle area, so that it is possible to reduce an amount of calculation of the processing of specifying the target rectangle area. As a result, it is possible to specify the target rectangle area at high speed. Here, in this illustrative embodiment, the target rectangle area is selected from the plurality of rectangle areas when the first line Ls1 is adopted as the specific line and from the plurality of rectangle areas when the second line Ls2 is adopted as the specific line. Therefore, compared to a configuration where the target rectangle area is specified in accordance with only one of the first line Ls1 and the second line Ls2, it is possible to suppress a rectangle area having a small area from being selected as the target rectangle area. Also, since the rectangle area of which the area is calculated is the rectangle area having two sides opposite to each other with the reference pixel Ps being interposed therebetween, it is possible to reduce an amount of calculation, compared to a configuration where the areas of all rectangle areas inscribed in the object area B11b are calculated.

Also, as described in FIG. 10, the pixel having the maximum sum value of the numbers of pixels Sr, Sl, Sd, Su is adopted as the reference pixel Ps. Therefore, as the reference pixel Ps, there is a high possibility that a pixel (for example, a pixel close to a center of the object area) far from the edge, rather than a pixel close to the edge of the object area, will be selected. As a result, when the target rectangle area is selected from the plurality of rectangle areas having opposing two sides with the reference pixel Ps being interposed therebetween, it is possible to suppress a rectangle area having a small area from being selected as the target rectangle area.

Also, as described in FIGS. 11 to 14, when calculating the respective areas of the plurality of rectangle areas having two sides based on the first line Ls1, the corrected numbers of pixels Sd, Su, which are calculated for each right attention pixel Pxr from the reference pixel Ps to the last pixel Psr, and the corrected numbers of pixels Sd, Su, which are calculated for each left attention pixel Pxl from the reference pixel Ps to the last pixel Psl, are used. The numbers of pixels Sd, Su of the right attention pixel Pxr are respectively the minimum value of the number of lower pixels Sd and the minimum value of the number of upper pixels Su from the reference pixel Ps to the right attention pixel Pxr. The numbers of pixels Sd, Su of the left attention pixel Pxl are respectively the minimum value of the number of lower pixels Sd and the minimum value of the number of upper pixels Su from the reference pixel Ps to the left attention pixel Pxl. By this configuration, the rectangle specifying unit 524 can easily specify the rectangle areas inscribed in the object area B11b and calculate the areas thereof. Also, the rectangle specifying unit 524 can easily specify the rectangle area having a maximum area, as the rectangle area inscribed in the object area B11b and having two sides based on the first line Ls1. Likewise, for the plurality of rectangle areas having two sides based on the second line Ls2, the rectangle specifying unit 524 specifies the rectangle areas inscribed in the object area B11b and calculates the areas thereof. By this configuration, the rectangle specifying unit 524 can easily specify the rectangle area having a maximum area inscribed in the object area B11b from the plurality of rectangle areas having two sides based on the first line Ls1 and the plurality of rectangle areas having two sides based on the second line Ls2.

B. Second Illustrative Embodiment

FIG. 15 is a schematic view illustrating an example of the synthesis image processing according to a second illustrative embodiment. The second illustrative embodiment is different from the first illustrative embodiment shown in FIG. 5, in that the position of the target image TI is determined for each of the assignment areas T10, T20, T30. The configuration of the image processing system used for the synthesis image processing is the same as that of the image processing system 1000 shown in FIG. 1. Also, the sequence of the synthesis image processing is the same as that shown in FIGS. 2 and 3, except that the method of determining the position of the target image TI is different. Hereinafter, it is assumed that the same target image TI as the target image TI of FIG. 4A is used.

Figure 15A:
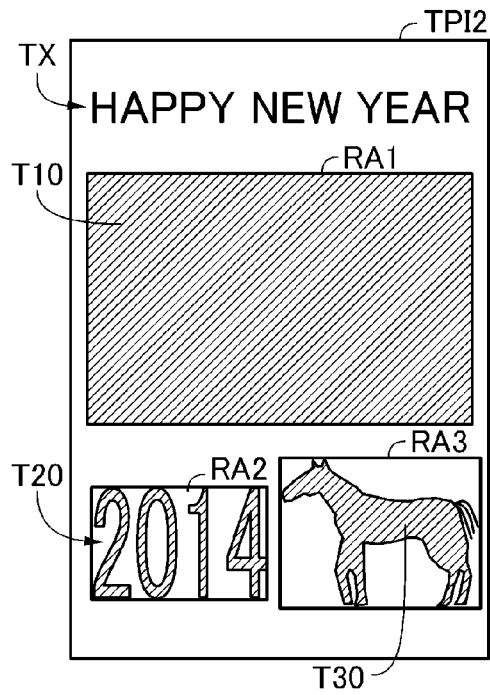
FIGS. 15A to 15E are schematic views illustrating an example of synthesis image processing according to a second illustrative embodiment.

FIG. 15A illustrates an example of the template image. The template image TPI2 has the same assignment areas T10, T20, T30 as the template image TPI1 shown in FIG. 5A. In this illustrative embodiment, the template image TPI2 further has reference areas RA1, RA2, RA3 associated with the assignment areas T10, T20, T30. The reference areas RA1, RA2, RA3 are areas including the assignment areas T10, T20, T30, respectively. In this illustrative embodiment, the reference areas RA1, RA2, RA3 are rectangle areas circumscribed to the assignment areas T10, T20, T30, respectively.

Figure 15B:
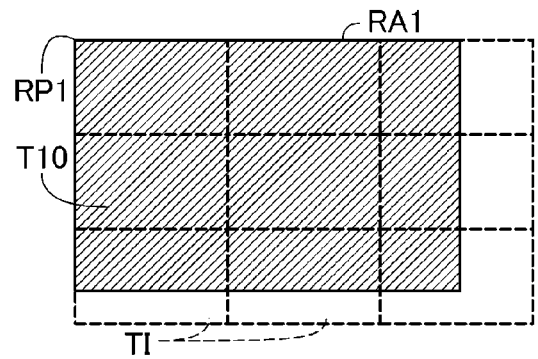
Figure 15C:
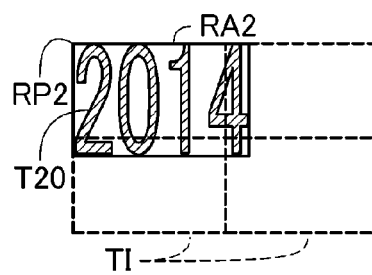
Figure 15E:
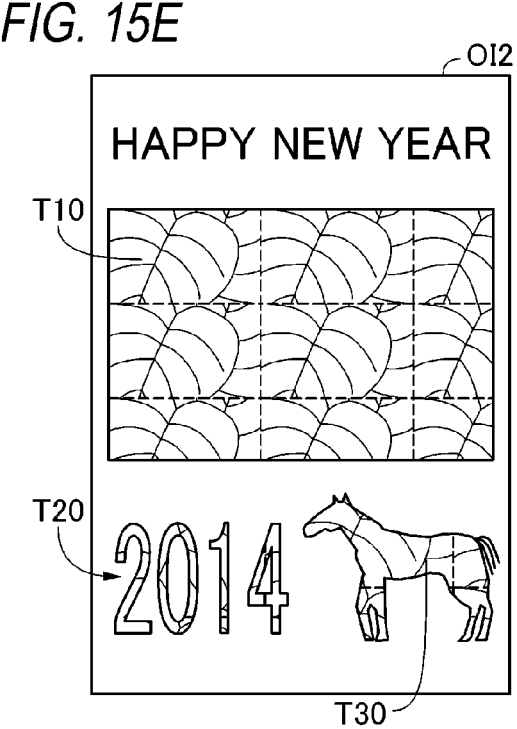
Figure 15D:
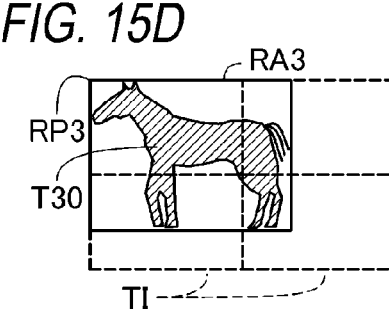

FIGS. 15B to 15D show arrangement examples of the target image TI to the respective assignment areas T10, T20, T30. In step S240 of FIG. 2, as shown in FIG. 15B, the output data generation unit 530 determines an arrangement of the plurality of target images TI to the first assignment area T10 so that the target images TI are continuously aligned over the entire first assignment area T10 on the basis of a left-upper corner RP1 of the first reference area RA1. Specifically, the plurality of target images TI is arranged in a lattice shape without a gap so that a left-upper corner of the target image TI coincides with the corner RP1 of the first reference area RA1. Likewise, the arrangement of the target images TI to the second assignment area T20 of FIG. 15C is determined on the basis of a left-upper corner RP2 of the second reference area RA2, and the arrangement of the target images TI to the third assignment area T30 of FIG. 15D is determined on the basis of a left-upper corner RP3 of the third reference area RA3.

FIG. 15E illustrates an example of the synthesis image. When the plurality of target images TI is arranged on the template image TPI2 in accordance with the arrangement determined on the basis of the first reference area RA1 (specifically, the left-upper corner RP1) in step S240 of FIG. 2, the output data generation unit 530 adopts, as an image of the first assignment area T10, parts of the plurality of target images TI overlapping with the first assignment area T10. This is also the same for the images of the other assignment areas T20, T30. In a synthesis image OI2 of FIG. 15E, the respective assignment areas T10, T20, T30 are indicated by the plurality of target images TI.

In this way, the output data generation unit 530 determines the arrangement of the target images TI for each of the assignment areas T10, T20, T30. Therefore, when using a template image having a plurality of assignment areas, it is possible to easily generate the output data indicating the synthesis image in which the target images are arranged in the respective assignment areas.

Incidentally, like the first illustrative embodiment, when the target image TI is larger than one assignment area, the number of target images TI to be arranged on the corresponding assignment area may be '1 (one)'.

Also, the synthesis image processing of the second illustrative embodiment is the same as the synthesis image processing of the first illustrative embodiment, except that the arrangements of the target images TI with respect to the assignment areas T10, T20, T30 are different. Therefore, the second illustrative embodiment can realize the same merits as the first illustrative embodiment.

C. Third illustrative Embodiment

Figure 16:
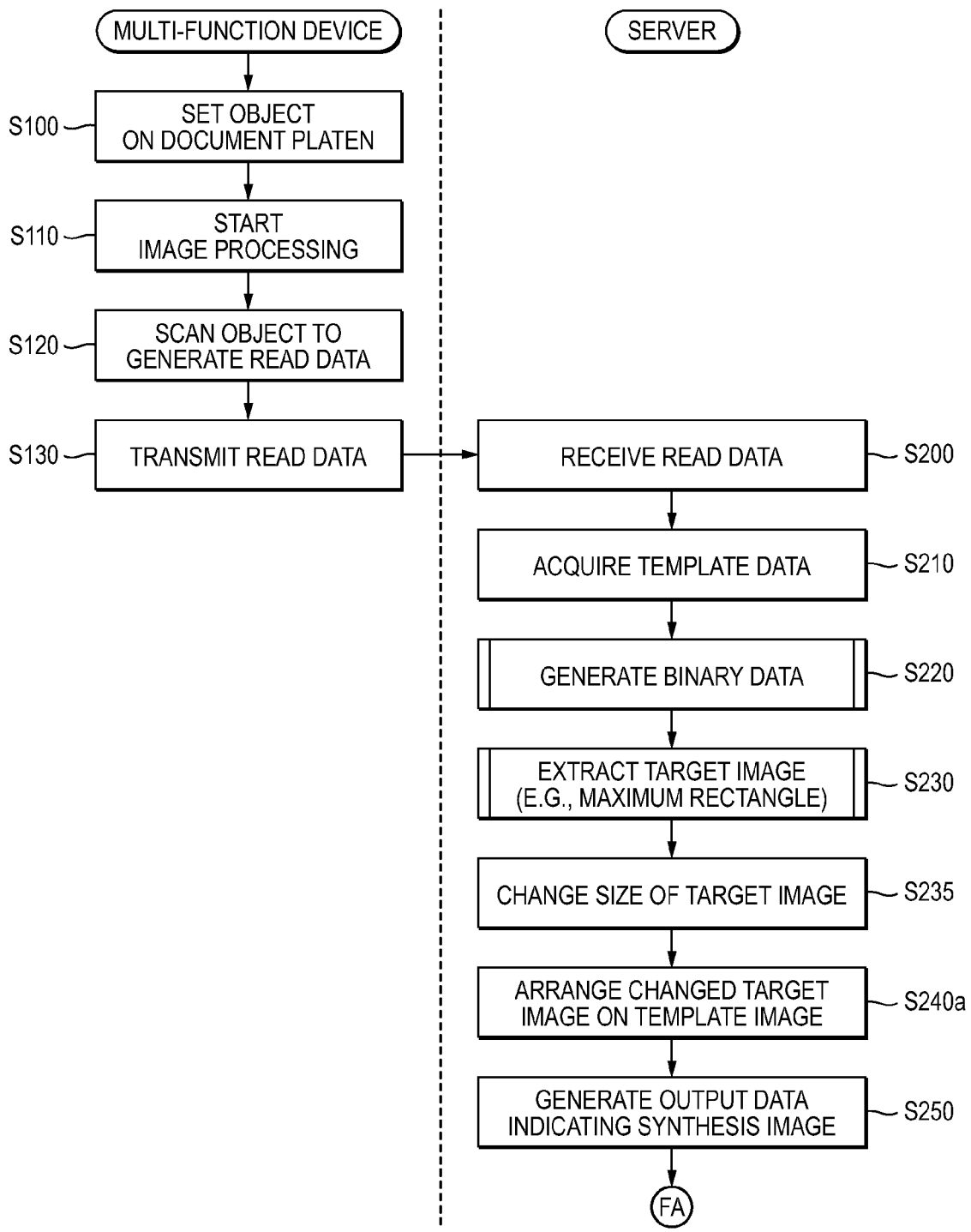
FIG. 16 is a flowchart showing another illustrative embodiment of the synthesis image processing.

FIG. 16 is a flowchart showing another illustrative embodiment of the synthesis image processing. The processing of FIG. 16 can be applied instead of the processing of FIG. 2. The same steps of FIG. 16 as those of FIG. 2 are denoted with the same reference numerals and the descriptions thereof are omitted. The processing subsequent to FIG. 16 is the same as the processing of FIG. 3. The configuration of the image processing system used for the synthesis image processing is the same as that of the image processing system 1000 shown in FIG. 1. Hereinafter, it is assumed that the same target image TI as the target image TI of FIG. 4A is used.

In this illustrative embodiment, unlike the illustrative embodiment of FIG. 2, the output data generation unit 530 changes the size of target image in conformity to the reference area including the assignment area and generates the synthesis image by using the changed target image. The flowchart of FIG. 16 is obtained by replacing step S240 of the flowchart shown in FIG. 2 with two steps S235, S240a. Since the other steps of FIG. 16 are the same as FIG. 2, the descriptions thereof are omitted.

Figure 17A:
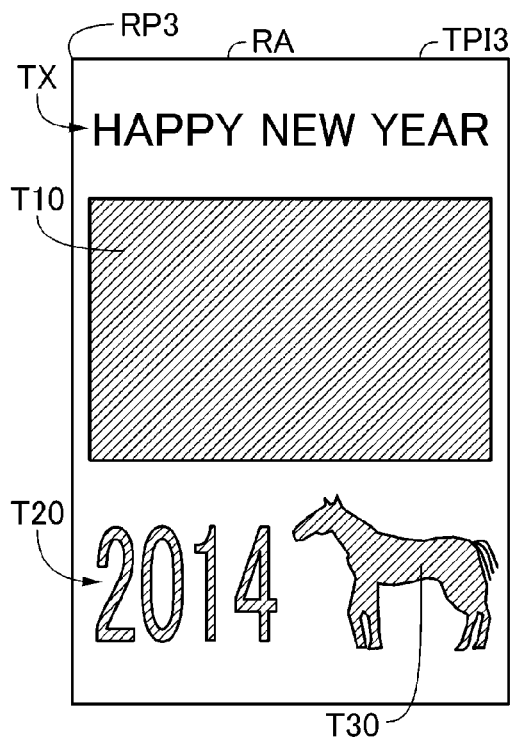
FIGS. 17A to 17C are schematic views illustrating an example of synthesis image processing according to a third illustrative embodiment.

FIG. 17A illustrates an example of the template image used in the third illustrative embodiment. The template image TPI3 has the same assignment areas T10, T20, T30 as the template image TPI2 shown in FIG. 15A. Also, the template image TPI3 has the same reference area RA as the entire area of the template image TPI3.

Figure 17C:
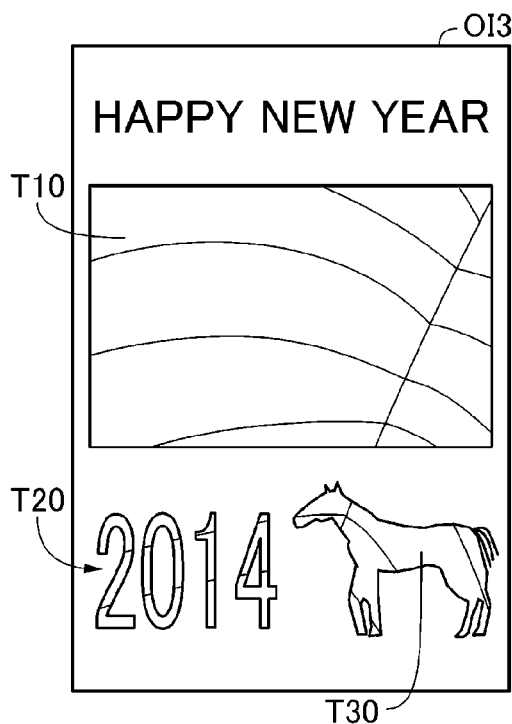
Figure 17B:
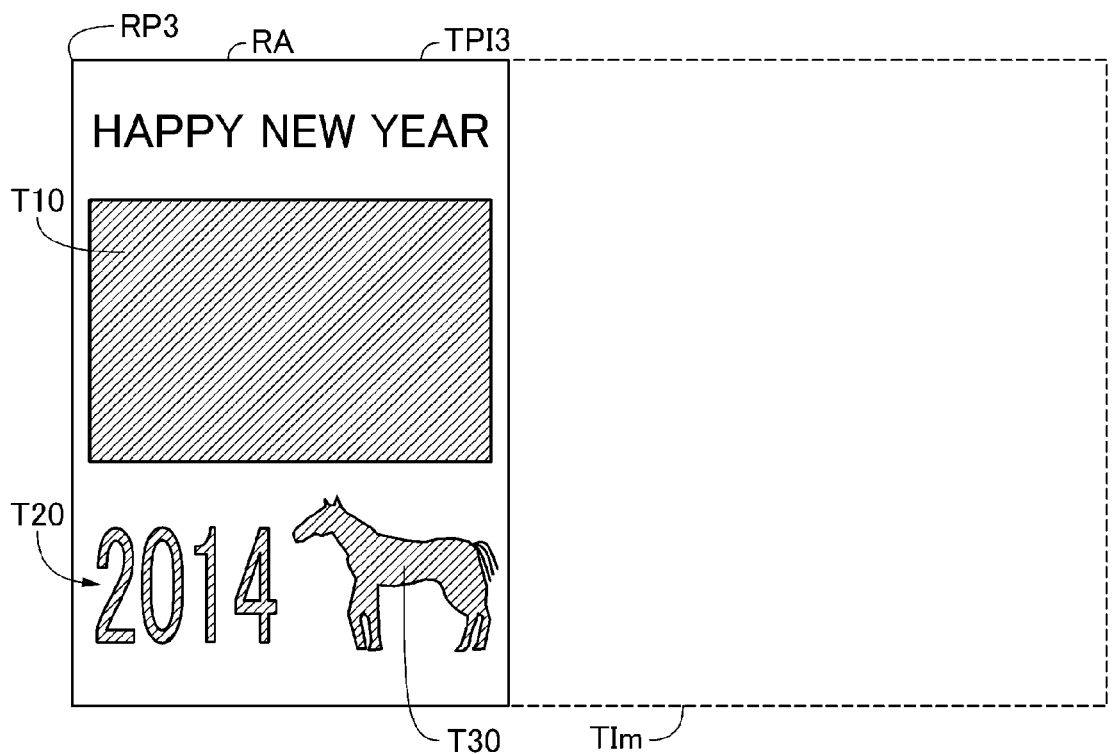

In step S235 of FIG. 16, the output data generation unit 530 changes the size of the target image in conformity to the reference area. FIG. 17B is a schematic view illustrating the template image TPI3 and a target image TIm of which size is changed in conformity to the reference area RA. As shown, the size of the target image is changed so that the changed target image TIm covers the entire reference area RA and the size of the changed target image TIm becomes smallest. An aspect ratio of the target image is maintained. The change of the size is made by changing the pixel density of the target image. That is, when enlarging the target image, the pixel density is increased, and when reducing the target image, the pixel density is decreased. A well-known method can be used as the method of changing the pixel density (for example, a bi-linear method or bi-cubic method).

In step S240a of FIG. 16, as shown in FIG. 17B, the output data generation unit 530 determines a position of the target image TIm with respect to the template image TPI3 (i.e., the assignment areas T10, T20, T30) so that a left-upper corner of the changed target image TIm coincides with the left-upper corner RP3 of the reference area RA.

In step S250 of FIG. 16, the output data generation unit 530 generates output data indicating the synthesis image. FIG. 17C is a schematic view illustrating an example of the synthesis image. When the target image TIm is arranged on the template image TPI3 in accordance with the arrangement determined in step S240a, the output data generation unit 530 adopts parts of the target image TIm overlapping with the assignment areas T10, T20, T30, as the images of the assignment areas T10, T20, T30. As shown in FIG. 17C, the respective assignment areas T10, T20, T30 in the synthesis image OI3 are indicated by the changed target image TIm.

As described above, in this illustrative embodiment, since the size of the target image is changed in conformity to the reference area RA including the assignment areas T10, T20, T30, the output data generation unit 530 can easily generate the output data indicating the synthesis image OI3 in which the changed target image TIm and the template image TPI3 are synthesized. Specifically, in this illustrative embodiment, the size of the target image is changed so that the changed target image TIm covers the entire reference area RA and the size of the changed target image TIm becomes smallest. Therefore, it is possible to suppress the size of the target image TIm from being excessively small and excessively large. As a result, the output data generation unit 530 can generate the output data indicating the synthesis image with which the content of the target image can be easily recognized.

Also, in this illustrative embodiment, the reference area RA is the same as the entire area of the template image TPI3. Therefore, since the size of the target image is changed in conformity to the entire template image TPI3, the output data generation unit 530 can easily generate the output data indicating the synthesis image. Incidentally, the reference area is not necessarily strictly matched with the entire area of the template image. However, the reference area is preferably substantially the same as the entire area of the template image. For example, a part (also referred to as a 'first part') of the template image may be excluded from the reference area. In this case, when a ratio of an area of the first part to an area (for example, the number of pixels) of the template image is 10% or smaller, it can be said that the reference area is substantially the same as the entire area of the template image. To the contrary, a part (also referred to as a 'second part') of the reference area may be arranged beyond the template image. In this case, when a ratio of an area of the second part to the area (for example, the number of pixels) of the template image is 10% or smaller, it can be said that the reference area is substantially the same as the entire area of the template image.

Also, the synthesis image processing of the third illustrative embodiment is the same as the synthesis image processing of the first illustrative embodiment, except that the template image and the target image of which size is changed are synthesized. Therefore, the third illustrative embodiment can realize the same merits as the first illustrative embodiment.

D. Fourth Illustrative Embodiment

FIG. 18 is a schematic view illustrating an example of the synthesis image processing according to a fourth illustrative embodiment. The fourth illustrative embodiment is different from the illustrative embodiment shown in FIG. 17, in that the size of the target image is changed for each of the assignment areas T10, T20, T30. The configuration of the image processing system used for the synthesis image processing is the same as that of the image processing system 1000 shown in FIG. 1. Also, the sequence of the synthesis image processing is the same as that shown in FIGS. 3 and 16, except that the method of determining the size of the target image is different. Hereinafter, it is assumed that the same target image TI as the target image TI of FIG. 4A is used.

Figure 18A:
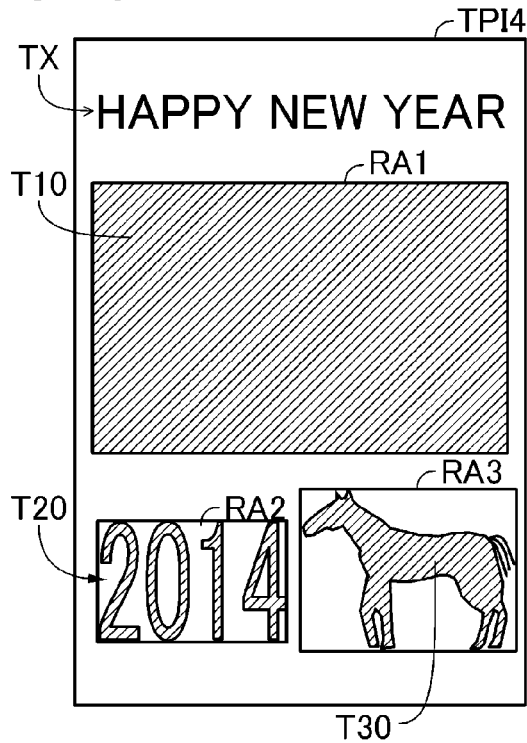
FIGS. 18A to 18E are schematic views illustrating an example of synthesis image processing according to a fourth illustrative embodiment.
Figure 18B:
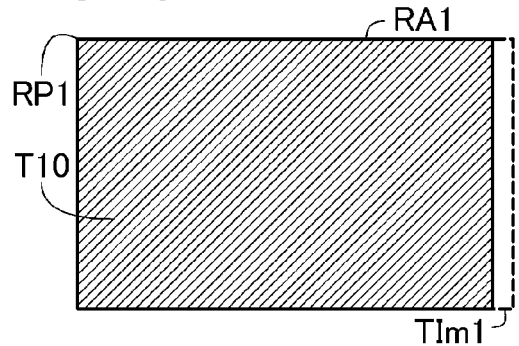
Figure 18C:
Figure 18D:
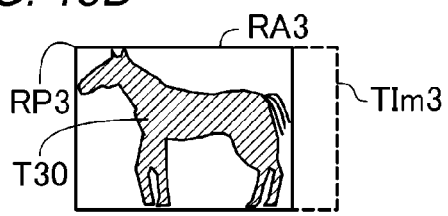

FIG. 18A illustrates an example of the template image. The template image TPI4 has the same assignment areas T10, T20, T30 as the template image TPI2 of FIG. 15A and the reference areas RA1, RA2, RA3. FIGS. 18B to 18D illustrate the reference areas RA1 to RA3 and the target images TIm1 to TIm3 of which sizes are changed in conformity to the reference areas RA1 to RA3, respectively.

In step S235 of FIG. 16, as shown in FIG. 18A, for example, the output data generation unit 530 changes the size of the target image so that the changed target image TIm1 covers the entire reference area RA1 and the size of the changed target image TIm1 becomes smallest. An aspect ratio of the target image is maintained. This is also the same for the reference areas RA2, RA3 and the target images TIm2, TIm3.

In step S240a of FIG. 16, as shown in FIG. 18B, for example, the output data generation unit 530 determines a position of the target image TIm1 with respect to the template image TPI4 (i.e., the reference area RA1) so that a left-upper corner of the changed target image TIm1 coincides with the left-upper corner RP1 of the reference area RA1. Likewise, positions of the other target images TIm2, TIm3 are also determined on the basis of the left-upper corners RP2, RP3 of the reference areas RA2, RA3.

Figure 18E:
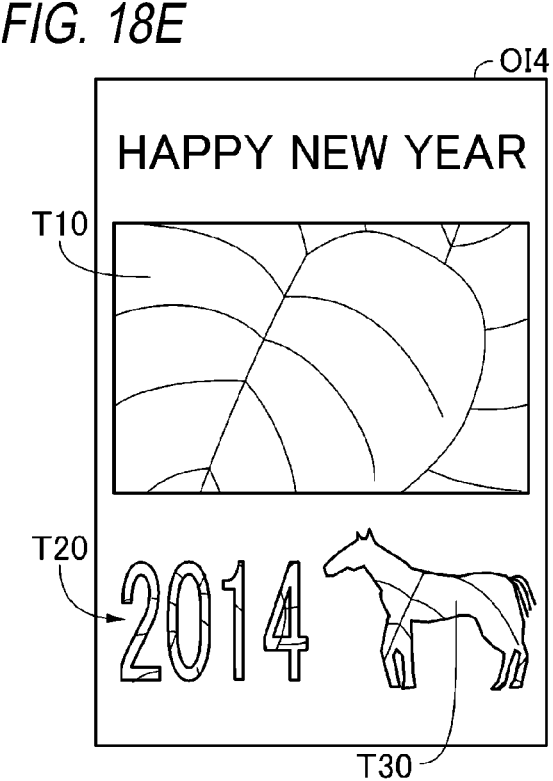

FIG. 18E illustrates an example of the synthesis image. When the changed first target image TIm1 is arranged on the template image TPI4 in accordance with the arrangement determined in step S240, the output data generation unit 530 adopts a part of the first target image TIm1 overlapping with the first assignment area T10, as the image of the first assignment area T10. This is also the same for the images of the other assignment areas T20, T30. In the synthesis image OI4 of FIG. 18E, the respective assignment areas T10, T20, T30 are indicated by the target images TIm1, TIm2, TIm3, respectively.

As described above, according to the fourth illustrative embodiment, the template image TPI4 has the plurality of reference areas RA1, R2, RA3 distant from each other, and the plurality of reference areas RA1, R2, RA3 includes the assignment areas T10, T20, T30, respectively. The output data generation unit 530 changes the sizes of the target images for each of the reference areas RA1, R2, RA3 in conformity to the reference areas RA1, R2, RA3. Therefore, the output data generation unit 530 can easily generate the output data indicating the synthesis image in which the target images are arranged in the respective assignment areas T10, T20, T30.

Specifically, in this illustrative embodiment, the size of the target image is changed so that the changed target image covers the entire reference area and the size of the changed target image becomes smallest. Therefore, it is possible to suppress the size of the target image from being excessively small and excessively large. As a result, the output data generation unit 530 can generate the output data indicating the synthesis image with which the content of the target image can be easily recognized.

Incidentally, the synthesis image processing of the fourth illustrative embodiment is the same as the synthesis image processing of the first illustrative embodiment, except that the template image and the target image of which size is changed for each reference area are synthesized. Therefore, the fourth illustrative embodiment can realize the same merits as the first illustrative embodiment.

E. Modified Embodiments (1) The configuration of the template image is not limited to the configurations of FIGS. 5, 15, 17 and 18, and a variety of configurations can be adopted. For example, the pixel density of the template image (i.e., the pixel density of the synthesis image) may be different from the pixel density of the read image (i.e., the target image). Also in this case, as the method of superimposing the target image and the template image, a method of superimposing the plurality of continuing pixels in the target image and the same number of continuing pixels in the template image one-on-one may be adopted.

The reference position used to determine the arrangement of the target image TI is not limited to the left-upper corner of the template image or reference area, and a position that is arbitrarily determined in advance may be adopted, such as a right-lower corner, a center position and the like. Also, the output data generation unit 530 may determine the reference position in accordance with a user's instruction.

As the assignment area in the template image, a variety of areas in which the target image is indicated can be adopted. For example, the assignment area may be semi-transparent (i.e., the transparency of the assignment area may be larger than 0% and smaller than 100%). In general, an area in which transparency is larger than 0% can be adopted as the assignment area. In this way, the assignment area can indicate the target image.

(2) As the target image used to generate the synthesis image, a variety of images including a part indicating the object in the read image can be adopted. For example, an image of a rectangle area circumscribed to the area indicating the object may be adopted as the target image.

(3) The arrangement of the target image with respect to the assignment area is not limited to the arrangements described in FIGS. 5, 15, 17 and 18, and a variety of arrangements can be adopted. For example, the output data generation unit 530 may determine the respective positions of the plurality of target images so that a predetermined gap is formed between the neighboring target images. Also, as the method of determining the arrangement of the target image with respect to the assignment area, the output data generation unit 530 may adopt a determining method that is selected by the user from a plurality of preset determining methods. For example, the user inputs an instruction to select one determining method through the operation unit 150, and the processing control unit 250 transmits information specifying the selected determining method to the server 400. The output data generation unit 530 of the server 400 determines the arrangement of the target image in accordance with the determining method specified by the received information. Also, as the plurality of determining methods, a plurality of determining methods, which are arbitrarily selected in advance from the determining methods of the illustrative embodiments shown in FIGS. 5, 15, 17 and 18, may be adopted.

(4) The method of extracting the target image from the read image is not limited to the method using the generation of binary data described in FIG. 6 and the specifying of the target rectangle area described in FIG. 9, and any method of extracting, as the target image, an image including a part indicating the object from the read image may be adopted. For example, the processing of step S510 (filling) of FIG. 6 may be omitted. However, when the processing of step S510 (filling) is executed, if the object has a hole, an area including the hole can be extracted as the first value area indicating the object. Also, the processing of step S520 of FIG. 6 may be omitted. However, when the processing of step S520 is executed, it is possible to reduce the amount of calculation of the processing of specifying the target rectangle area. Incidentally, the first value area indicating the object in the final binary image may include pixels indicating the background in the read image RI. Also, in the blocking processing of step S520, when a ratio of the number of pixels having a first value in one block to a total number of pixels in the one block exceeds a predetermined threshold value (for example, 50%) larger than zero and smaller than 100%, the pixel value of the block may be set to the first value.

Also, in step S630 of FIG. 9, the processing described in FIG. 13 may be applied to only one of the first line Ls1 and the second line Ls2. That is, the rectangle specifying unit 524 may specify the target rectangle area from the plurality of rectangle areas having two sides based on only one of the first line Ls1 and the second line Ls2. Also, the method of specifying the target rectangle area inscribed in the object area of the final binary image is not limited to the method described in FIGS. 11 to 14, and any method can be adopted. For example, the rectangle specifying unit 524 may specify the target rectangle area by calculating the areas and determining whether or not to be inscribed in the object area for all possible combinations of the respective positions of the four sides of the rectangle area.

(5) A display check may be performed, instead of the trial printing. For example, in step S340 of FIG. 3, the output data generation unit 530 generates data for display (for example, JPEG data) indicating the synthesis image. In step S350, the data transmission unit 540 transmits the data for display to the multi-function device 100. In step S360, the processing control unit 250 displays an output image on the display unit 140 by using the data for display. In step S370, the user inputs an instruction indicating whether or not to perform the printing by observing the synthesis image displayed on the display unit 140. Then, the processing control unit 250 transmits the instruction indicating whether or not to perform the printing to the server 400, in response to the user's instruction. Incidentally, the advance check such as the trial printing and the display check may be omitted.

(6) The document that is printed by the synthesis image processing is not limited to the greeting card, and a variety of documents can be adopted. For example, a poster may be printed by the synthesis image processing. Also, the use of the output data is not limited to the printing, and various printings (for example, display) can be adopted. In general, the data transmission unit 540 preferably transmits the output data to an image output apparatus (a printing apparatus or display apparatus). Also, the data transmission unit 540 may transmit the output data to any apparatus (for example, a storage device (also referred to as a NAS) connected to the network) capable of performing communication by the server 400 or an apparatus (for example, a portable phone) designated by the user, without being limited to the image output apparatus. Also, the data transmission unit 540 may be omitted and the output data generation unit 530 may store the generated output data in the storage device (for example, the non-volatile storage device 430) of the server 400.

(7) The configuration of the image processing system implementing the synthesis image processing is not limited to the configuration shown in FIG. 1, and the other configurations can be adopted. For example, the scanner 170 and the printer 180 may be provided as separate apparatuses, without being incorporated into one apparatus (here, the multi-function device 100). In any case, the data transmission unit 540 preferably transmits the output data to an image output apparatus (for example, a printing apparatus).

Also, the image reading apparatus of optically reading a target to generate the image data indicating the target is not limited to the scanner 170, and a variety of apparatuses can be adopted. For example, a digital camera may be adopted.

(8) The processing apparatus of generating the output data by using the read image data generated by the image reading apparatus is not limited to the server 400, and a variety of apparatuses can be adopted. For example, a PC, a digital camera, a portable phone and a multi-function device (for example, the multi-function device 100) may implement the functions implemented by the server 400. Also, a plurality of apparatuses (for example, computers) capable of performing communication with each other through the network may share parts of the functions of the generation processing of generating the output data by using the read image data and provide the functions of the generation processing as a whole (a system having the apparatuses corresponds to the image processing apparatus). For example, a first server playing a role in a user interface (an inquiry about a user and reception of an instruction from a user) and a second server playing a role in the image processing (interpretation of the read image data and generation of the output data) may cooperate with each other to perform the generation processing.

In the respective illustrative embodiments, a part of the configuration implemented by the hardware may be replaced with software and a part of the configuration implemented by the software may be replaced with hardware. For example, the function of the binarization processing unit 522 shown in FIG. 1 may be implemented by a dedicated hardware circuit having a logical circuit.

Also, when a part or all of the functions of the present invention is implemented by a computer program, the program may be provided with being stored in a computer-readable recording medium (for example, a non-temporary recording medium). The program may be used as it is provided or with being stored in another recording medium (a computer-readable recording medium). The computer-readable recording medium is not limited to a portable recording medium such as a memory card and a CD-ROM and includes an internal storage device in a computer, such as various RAMs and ROMs, and an external storage device connected to the computer, such as a hard disk drive.

Although the present invention has been described with reference to the illustrative embodiments and the modified embodiments, the illustrative embodiments are provided to easily understand the present invention, not to limit the present invention. The present invention can be changed and improved without departing from the gist thereof and the claims, and includes the equivalents thereto.

What is claimed is:

1. A processing apparatus comprising:
a processor; and
a memory storing instructions that when executed by the processor, cause the processing apparatus to perform:
receiving read image data, which is image data generated by reading an object with an image reading apparatus;
extracting a target image, which is an image having a part indicating the object, from a read image that is an image indicated by the read image data; and
generating output data, which indicates a synthesis image in which the target image and a template image are synthesized,
wherein the template image has an assignment area to which the target image is assigned, and
wherein the generating comprises using two or more target images overlapping with the assignment area for generation of the synthesis image if a plurality of the target images is arranged to be continuously aligned over the entire template image based on a specific reference position associated with the template image.

2. The processing apparatus according to claim 1,
wherein the template image has a plurality of assignment areas distant from each other, and
wherein the generating comprises, for each of the plurality of assignment areas, using the two or more target images overlapping with a respective one of the plurality of assignment areas for generation of the synthesis image if a plurality of the target images is arranged to be continuously aligned in each of the assignment areas based on specific reference positions associated with each of the assignment areas.

3. The processing apparatus according to claim 1,
wherein the instructions, when executed by the processor, cause the processing apparatus to further perform:
generating binary data, which is indicated by a binary of a first value indicating the object and a second value indicating a background, by using the read image data; and
specifying a target rectangle area that is configured by pixels consisting of the first value by interpreting the binary data,
wherein the extracting comprises extracting an image of the target rectangle area in the read image as the target image, and
wherein the specifying comprises:
specifying a reference pixel, which is a specific pixel to be used as a reference for specifying the target rectangle area, from an object area, which is an area where a plurality of pixels consisting of the first value continuously aligns, of a binary image indicated by the binary data; and
specifying, as the target rectangle area, a rectangle area having a maximum area from a plurality of rectangle areas, each of the plurality of rectangle areas being a rectangle area inscribed in the object area and having a first side, which passes a first pixel of a plurality of pixels overlapping a specific line passing the reference pixel in the object area and is orthogonal to the specific line, and a second side, which passes a second pixel positioned at a side of the reference pixel opposite the first pixel and is orthogonal to the specific line.

4. The processing apparatus according to claim 3,
wherein when two lines passing a first attention pixel of the plurality of pixels in the object area and being orthogonal to each other are referred to as a first line and a second line, when two pixels arranged at two intersection positions of an outline of the object area and the first line are referred to as a first end pixel, and a second end pixel, and when two pixels arranged at two intersection positions of the outline of the object area and the second line are referred to as a third end pixel and a fourth end pixel,
the specifying the target rectangle area comprises adopting, as the reference pixel, the first attention pixel having a maximum sum of a number of pixels between the first attention pixel and the first end pixel, a number of pixels between the first attention pixel and the second end pixel, a number of pixels between the first attention pixel and the third end pixel and a number of pixels between the first attention pixel and the fourth end pixel from the plurality of pixels in the object area.

5. The processing apparatus according to claim 3,
wherein when two pixels arranged at two intersection positions of the specific line and an outline of the object area are referred to as a first last pixel and a second last pixel, when two pixels arranged at two intersection positions of a line, which passes a second attention pixel on the specific line and is orthogonal to the specific line, and the outline of the object area are referred to as a first intersection pixel and a second intersection pixel, when a number of pixels between the second attention pixel and the first intersection pixel is referred to as a first number of pixel and a number of pixels between the second attention pixel and the second intersection pixel is referred to as a second number of pixel,
the specifying the target rectangle area comprises:
calculating a first minimum value, which is a minimum value of the first number of pixels, and a second minimum value, which is a minimum value of the second number of pixels, from among the second attention pixels between the reference pixel and the first last pixel;
calculating a third minimum value, which is a minimum value of the first number of pixels, and a fourth minimum value, which is a minimum value of the second number of pixels, from among the second attention pixels between the reference pixel and the second last pixel; and calculating areas of the rectangle areas having the first side and the second side by using the first minimum value and the second minimum value associated with the second attention pixels included on the first side and the third minimum value and the fourth minimum value associated with the second attention pixels included on the second side.

6. The processing apparatus according to claim 1, wherein the output data is data for enabling a printing apparatus to print the synthesis image on a printing medium having a predetermined size, and wherein the generating comprises generating trial data, which is data enabling the printing apparatus to perform a trial printing of the synthesis image on a printing medium larger than the predetermined size.

7. A processing apparatus comprising:

a processor; and a memory storing instructions, the instructions, when executed by the processor, causing the processing apparatus to perform:

receiving read image data, which is image data generated by reading an object with an image reading apparatus;

extracting a target image, which is an image having a part indicating the object, from a read image that is an image indicated by the read image data; and generating output data, which indicates a synthesis image in which an image obtained by changing a size of the target image and a template image are synthesized, wherein the template image has:

an assignment area to which the target image is assigned; and a reference area that has the assignment area and becomes a reference of the change in the size of the target image, and wherein the generating comprises changing the size of the target image in conformity to the reference area.

8. The processing apparatus according to claim 7, wherein the reference area is substantially the same as an entire area of the template image.

9. The processing apparatus according to claim 7, wherein the template image has a plurality of reference areas distant from each other, wherein each of the plurality of reference areas has a corresponding assignment area, and wherein for each of the plurality of reference areas, the generating comprises changing the size of each of the target images in conformity to the corresponding areas assignment area.

10. The processing apparatus according to claim 7, wherein the instructions, when executed by the processor, cause the processing apparatus to further perform:

generating binary data, which is indicated by a binary of a first value indicating the object and a second value indicating a background, by using the read image data; and specifying a target rectangle area that is configured by pixels consisting of the first value by interpreting the binary data, wherein the extracting comprises extracting an image of the target rectangle area in the read image as the target image, and wherein the specifying comprises:

specifying a reference pixel, which is a specific pixel to be used as a reference for specifying the target rectangle area, from an object area, which is an area where a plurality of pixels consisting of the first value continuously aligns, of a binary image indicated by the binary data; and specifying, as the target rectangle area, a rectangle area having a maximum area from a plurality of rectangle areas, each of the plurality of rectangle areas being a rectangle area inscribed in the object area and having a first side, which passes a first pixel of a plurality of pixels overlapping a specific line passing the reference pixel in the object area and is orthogonal to the specific line, and a second side, which passes a second pixel positioned at a side of the reference pixel opposite the first pixel and is orthogonal to the specific line.

11. The processing apparatus according to claim 10, wherein when two lines passing a first attention pixel of the plurality of pixels in the object area and being orthogonal to each other are referred to as a first line and a second line, when two pixels arranged at two intersection positions of an outline of the object area and the first line are referred to as a first end pixel, and a second end pixel, and when two pixels arranged at two intersection positions of the outline of the object area and the second line are referred to as a third end pixel and a fourth end pixel, the specifying the target rectangle area comprises adopting, as the reference pixel, the first attention pixel having a maximum sum of a number of pixels between the first attention pixel and the first end pixel, a number of pixels between the first attention pixel and the second end pixel, a number of pixels between the first attention pixel and the third end pixel and a number of pixels between the first attention pixel and the fourth end pixel from the plurality of pixels in the object area.

12. The processing apparatus according to claim 10, wherein when two pixels arranged at two intersection positions of the specific line and an outline of the object area are referred to as a first last pixel and a second last pixel, when two pixels arranged at two intersection positions of a line, which passes a second attention pixel on the specific line and is orthogonal to the specific line, and the outline of the object area are referred to as a first intersection pixel and a second intersection pixel, when a number of pixels between the second attention pixel and the first intersection pixel is referred to as a first number of pixel and a number of pixels between the second attention pixel and the second intersection pixel is referred to as a second number of pixel, the specifying the target rectangle area comprises:

calculating a first minimum value, which is a minimum value of the first number of pixels, and a second minimum value, which is a minimum value of the second number of pixels, from among the second attention pixels between the reference pixel and the first last pixel;

calculating a third minimum value, which is a minimum value of the first number of pixels, and a fourth minimum value, which is a minimum value of the second number of pixels, from among the second attention pixels between the reference pixel and the second last pixel; and calculating areas of the rectangle areas having the first side and the second side by using the first minimum value and the second minimum value associated with the second attention pixels included on the first side and the third minimum value and the fourth minimum value associated with the second attention pixels included on the second side.

13. The processing apparatus according to claim 7,
wherein the output data is data for enabling a printing apparatus to print the synthesis image on a printing medium having a predetermined size, and
wherein the generating comprises generating trial data, which is data enabling the printing apparatus to perform a trial printing of the synthesis image on a printing medium larger than the predetermined size.

14. A non-transitory computer-readable medium having a computer program stored thereon and readable by a computer, the computer program, when executed by the computer, causes the computer to perform operations comprising:
receiving read image data, which is image data generated by reading an object with an image reading apparatus;
extracting a target image, which is an image including a part indicating the object, from a read image that is an image indicated by the read image data; and
generating output data, which indicates a synthesis image in which the target image and a template image are synthesized,
wherein the template image has an assignment area to which the target image is assigned, and
wherein the generating comprises using two or more target images overlapping with the assignment area for generation of the synthesis image if a plurality of the target images is arranged to be continuously aligned over the entire template image based on a specific reference position associated with the template image.

15. A non-transitory computer-readable medium having a computer program stored thereon and readable by a computer, the computer program, when executed by the computer, causes the computer to perform operations comprising:
receiving read image data, which is image data generated by reading an object with an image reading apparatus;
extracting a target image, which is an image having a part indicating the object, from a read image that is an image indicated by the read image data; and
generating output data, which indicates a synthesis image in which an image obtained by changing a size of the target image and a template image are synthesized,
wherein the template image has:
an assignment area to which the target image is assigned; and
a reference area that has the assignment area and becomes a reference of the change in the size of the target image, and
wherein the generating comprises changing the size of the target image in conformity to the reference area.

16. A processing apparatus comprising:
a processor; and
a memory storing instructions that, when executed by the processor, cause the processing apparatus to perform:
receiving read image data, which is image data generated by reading an object with an image reading apparatus;
extracting a target image, which is an image having a part indicating the object, from a read image that is an image indicated by the read image data; and
generating output data, which indicates a synthesis image in which the target image and a template image are synthesized,
wherein the template image has a plurality of assignment areas distant from each other, and
wherein the generating comprises, for each of the plurality of assignment areas, using two or more target images overlapping with a respective one of the plurality of assignment areas for generation of the synthesis image if a plurality of the target images is arranged to be continuously aligned in each of the assignment areas based on specific reference positions associated with each of the assignment areas.

17. A non-transitory computer-readable medium having a computer program stored thereon and readable by a computer, the computer program, when executed by the computer, causes the computer to perform operations comprising:
receiving read image data, which is image data generated by reading an object with an image reading apparatus;
extracting a target image, which is an image including a part indicating the object, from a read image that is an image indicated by the read image data; and
generating output data, which indicates a synthesis image in which the target image and a template image are synthesized,
wherein the template image has a plurality of assignment areas distant from each other, and
wherein the generating comprises, for each of the plurality of assignment areas, using two or more target images overlapping with a respective one of the plurality of assignment areas for generation of the synthesis image if a plurality of the target images is arranged to be continuously aligned in each of the assignment areas based on specific reference positions associated with each of the assignment areas.

18. An image processing system comprising:
an image processing apparatus; and
a server that communicates with the image processing apparatus,
wherein the image processing apparatus comprises:
a scanner unit that scans an object and generates read image data;
a first communication interface that transmits the read image data to the server; and
a printer unit that prints print image data received through the first communication interface from the server onto a sheet,
wherein the server comprises:
a second communication interface that receives the read image data transmitted from the image processing apparatus;
a processor; and
a memory storing instructions that, when executed by the processor, cause the server to perform:
receiving the read image data transmitted from the image processing apparatus through the second communication interface;
extracting a target image, which is an image having a part indicating the object, from a read image that is an image indicated by the read image data;
generating output data, which indicates a synthesis image in which the target image and a template image are synthesized; and
transmitting the output data as the print image data to the image processing apparatus through the second communication interface,
wherein the template image has an assignment area to which the target image is assigned, and
wherein the generating comprises using two or more target images overlapping with the assignment area for generation of the synthesis image if a plurality of the target images is arranged to be continuously aligned over the entire template image based on a specific reference position associated with the template image.

19. An image processing system comprising:
an image processing apparatus; and
a server that communicates with the image processing apparatus,
wherein the image processing apparatus comprises:
- a scanner unit that scans an object and generates read image data;
- a first communication interface that transmits the read image data to the server; and
- a printer unit that prints print image data received through the first communication interface from the server onto a sheet, wherein the server comprises:
- a second communication interface that receives the read image data transmitted from the image processing apparatus;
- a processor; and
- a memory storing instructions, the instructions, when executed by the processor, causing the server to perform:
  - receiving the read image data transmitted from the image processing apparatus through the second communication interface;
  - extracting a target image, which is an image having a part indicating the object, from a read image that is an image indicated by the read image data;
  - generating output data, which indicates a synthesis image in which the target image and a template image are synthesized; and
  - transmitting the output data as the print image data to the image processing apparatus through the second communication interface, wherein the template image has a plurality of assignment areas distant from each other, and
wherein the generating comprises, for each of the plurality of assignment areas, using two or more target images overlapping with a respective one of the plurality of assignment areas for generation of the synthesis image if a plurality of the target images is arranged to be continuously aligned in each of the assignment areas based on specific reference positions associated with each of the assignment areas.

20. An image processing system comprising:
an image processing apparatus; and
a server that communicates with the image processing apparatus,
wherein the image processing apparatus comprises:
- a scanner unit that scans an object and generates read image data;
- a first communication interface that transmits the read image data to the server; and
- a printer unit that prints print image data received through the first communication interface from the server onto a sheet, wherein the server comprises:
- a second communication interface that receives the read image data transmitted from the image processing apparatus;
- a processor; and
- a memory storing instructions that, when executed by the processor, cause the server to perform:
  - receiving the read image data transmitted from the image processing apparatus through the second communication interface;
  - extracting a target image, which is an image having a part indicating the object, from a read image that is an image indicated by the read image data;
  - generating output data, which indicates a synthesis image in which an image obtained by changing a size of the target image and a template image are synthesized,
  - transmitting the output data as the print image data to the image processing apparatus through the second communication interface, wherein the template image has:
- an assignment area to which the target image is assigned; and
- a reference area that has the assignment area and becomes a reference of the change in the size of the target image, and wherein the generating comprises changing the size of the target image in conformity with the reference area.

* * * * *